(12) United States Patent
Machiyama

(10) Patent No.: US 7,701,597 B2
(45) Date of Patent: Apr. 20, 2010

(54) IMAGE PROCESSING APPARATUS AND IMAGE FORMING SYSTEM

(75) Inventor: Kenichi Machiyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1302 days.

(21) Appl. No.: 11/132,304

(22) Filed: May 19, 2005

(65) Prior Publication Data

US 2005/0265066 A1  Dec. 1, 2005

(30) Foreign Application Priority Data

May 28, 2004  (JP) ............................. 2004-159454

(51) Int. Cl.
*G06F 15/00* (2006.01)
*G06F 15/16* (2006.01)

(52) U.S. Cl. ...................................... 358/1.14; 709/219

(58) Field of Classification Search ............... 358/1.14, 358/1.15, 1.13, 496, 419, 1.5, 494, 474, 296; 379/91.09, 93.06; 717/175; 709/201, 223, 709/219, 246; 400/76; 399/1, 87, 81, 204, 399/364

See application file for complete search history.

(56) References Cited

U.S. PATENT DOCUMENTS 6,088,118 A * 7/2000 van Vliembergen et al. ...... 358/1.14
6,421,135 B1 * 7/2002 Fresk et al. ................ 358/1.15

FOREIGN PATENT DOCUMENTS

JP  09-193512  7/1997

* cited by examiner

*Primary Examiner*—Saeid Ebrahimi Dehkordy
(74) *Attorney, Agent, or Firm*—Rabin & Berdo, P.C.

(57) ABSTRACT

Personal computers and a printer are linked via an image processing apparatus. A first memory stores data received from computers. A second memory stores data received from an original. An output interface receives the data from the transfer data buffer and the image buffer and outputs the data to the printer. A printer status detector obtains the status of the printer to determine whether the printer is unable to print. A cancel commanding section commands the printer to clear the data received from the output interface when the printer is unable to print. A data identifier identifies whether the data output through the output interface is the data from the image buffer. When the data identifier identifies that the data outputted from the output interface is data from the image buffer, the cancel commanding section commands the printer to clear the data received from the output interface.

15 Claims, 20 Drawing Sheets

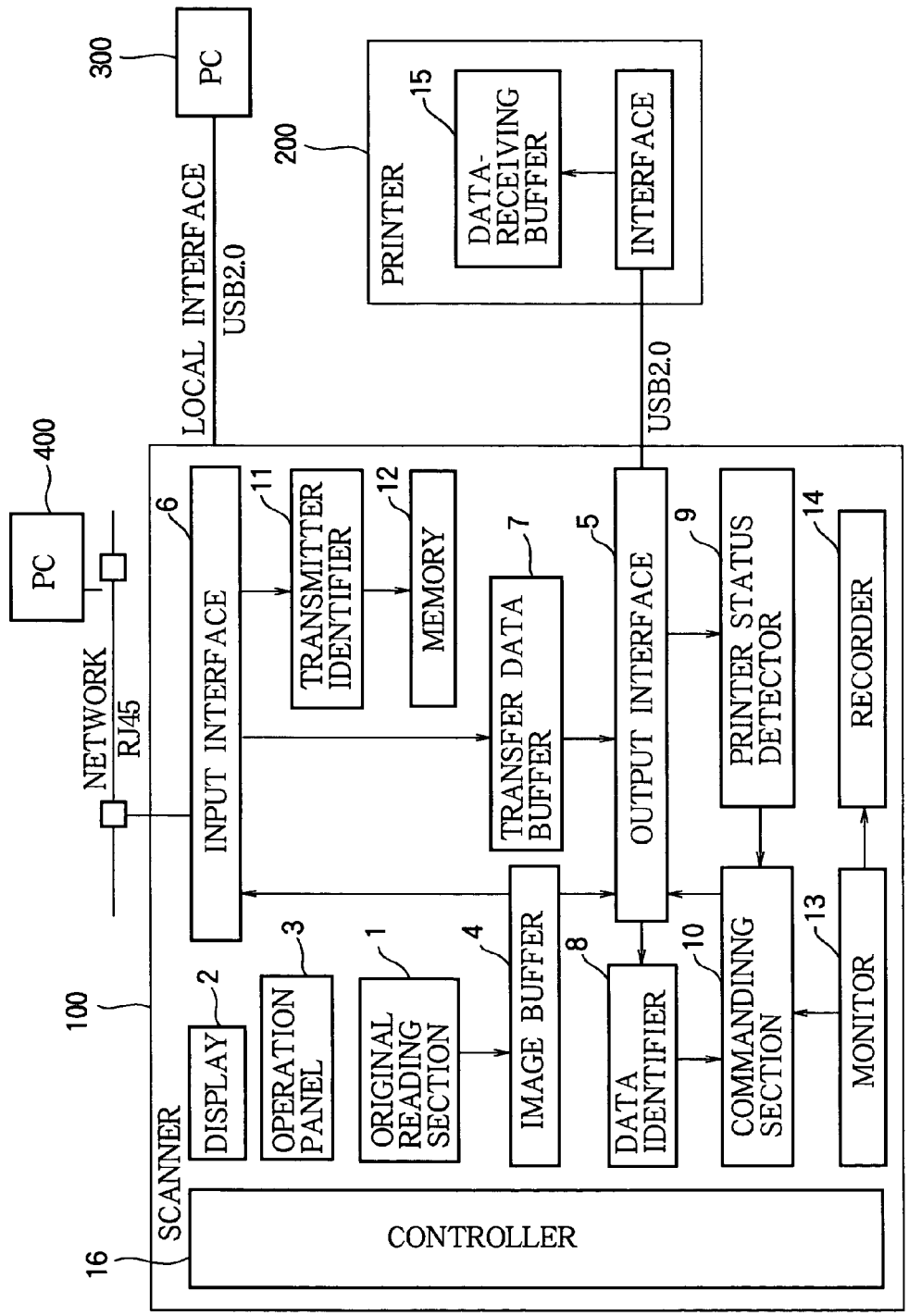

FIG.2A

Copy Completed

FIG.2B

Copy Failed
Paper Jam

FIG.2C

Paper Jam

FIG.2D

Copy Cancel (Y : CONTINUE/N : STOP)
Paper Empty

FIG.2E

"PrintDataFile.prn" Printing
Print Cancel (Y : Start/N : Stop)

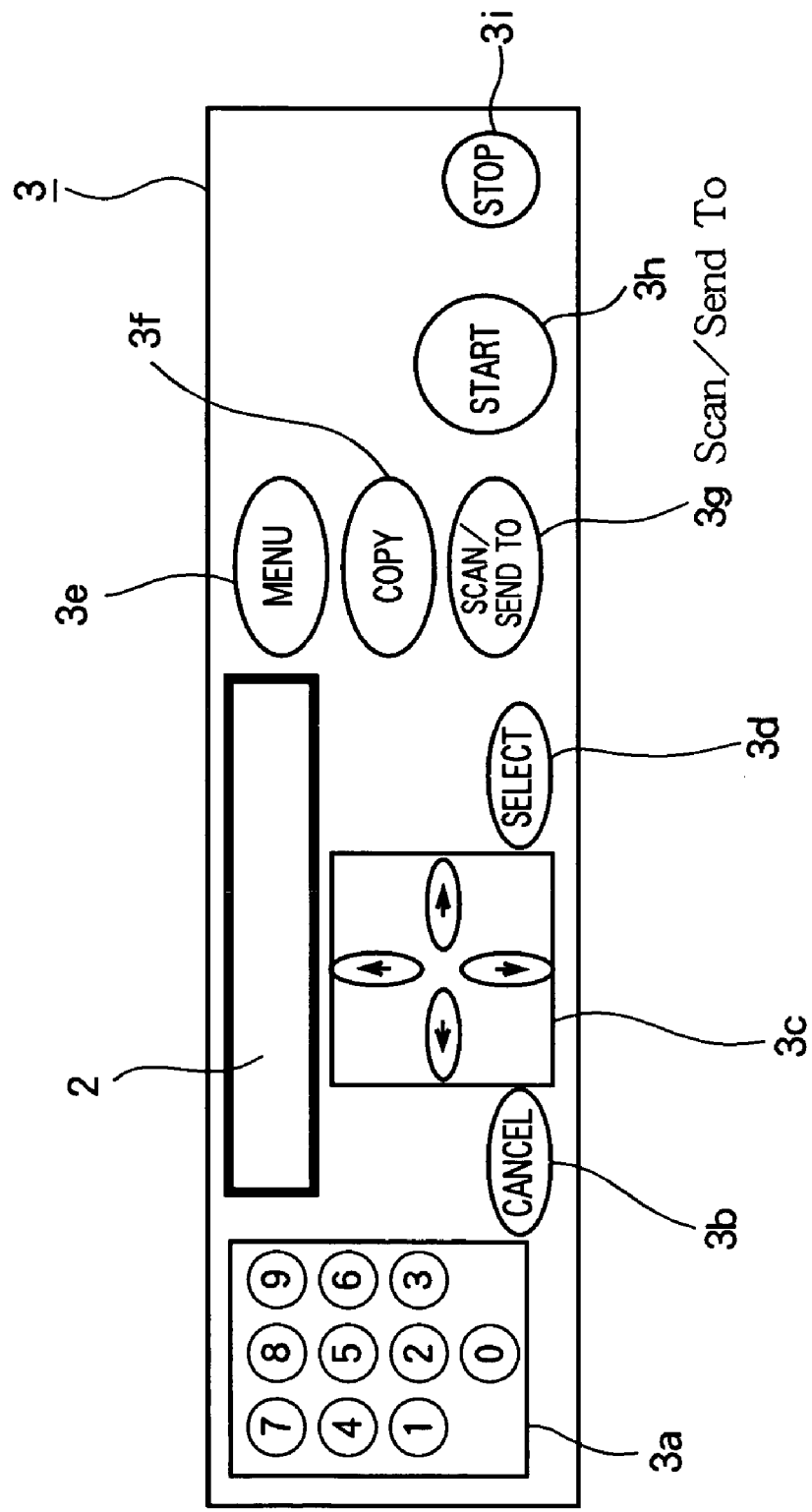

IMAGE PROCESSING APPARATUS AND IMAGE FORMING SYSTEM

BACKGROUND OF THE INVENTION

1. Field of the Invention

The present invention relates to an image forming system and more particularly to an image processing apparatus linked to a host apparatus and a printer in the image forming system.

2. Description of the Related Art

A conventional apparatus having a scanner and a printer is capable of performing a copying operation. The scanner reads an original and transfers the read data of the original directly to the printer, which in turn performs a copying operation.

When trouble occurs in the printer in the middle of a printing operation of the data received from the scanner, the printing is stopped and the data remains in the printer. When an abnormal condition occurs in the scanner during a printing operation, the copying operation can be ceased and the data read through the scanner is erased but the data that has been received in the printer cannot be erased. Therefore, the data remaining in the printer must be printed out once the abnormal condition is removed from the printer.

SUMMARY OF THE INVENTION

The present invention was made to solve the aforementioned problems. An object of the invention is to provide an image forming apparatus and an image forming system that are capable of removing a system failure that occurs in the image forming system due to abnormal conditions, for example, the printer is unable to print.

Personal computers and a printer are linked via an image processing apparatus. The image processing apparatus includes a first memory, a second memory, an outputting section, a detecting section, and a cancel commanding section. The first memory stores data received from a host apparatus such as a computer. The second memory stores data read from an original. The outputting section receives the data from the first memory and the second memory, and outputs the data to a printing apparatus. The detecting section obtains a status of the printing apparatus, and determines whether the printing apparatus cannot print. The cancel commanding section commands the printing apparatus to clear the data received from the outputting section when the detecting section determines that the printing apparatus is unable to print.

The image processing apparatus further includes a data identifying section that identifies whether the data outputted from the outputting section is data from the second memory. When the data identifying section identifies that the data outputted from the outputting section is data from the second memory and the detecting section determines whether the printing apparatus is unable to print, the cancel commanding section commands the printing apparatus to clear the data received from the outputting section.

The image processing apparatus further includes a transmitter identifying section, a memory, and an operating section. The transmitter identifying section obtains identification information on the data stored in the first memory. The memory stores the identification information. When the data identifying section identifies that the data outputted from the outputting section is data from the second memory and the detecting section determines that the printing apparatus is unable to print, the display section displays the identification information and a display screen that prompts the operator to select either continuation of outputting of data to the printing apparatus or interruption of outputting of data to printing section, the identification information and a display screen being displayed. The operator selects through the operating section either continuation of outputting of data to the printing apparatus or interruption of outputting of data to the printing apparatus.

The image processing apparatus further includes a display section and an operating section. When the data identifying section identifies that the data output from the outputting section is the data from the second memory and the detecting section determines that the printing apparatus is unable to print, the display section displays a screen that prompts the operator to select either continuation of outputting of data to the printing apparatus or interruption of outputting of data to the printing apparatus. The operator selects through the operating section either continuation of outputting of data to the printing apparatus or interruption of outputting of data to the printing apparatus.

The image processing apparatus further includes an interface section that notifies the host apparatus that the printing apparatus has terminated a printing operation due to an error. The interface section notifies the host apparatus when the data identifying section identifies that the data outputted from the outputting section is not from the second memory and the monitor determines that the printing apparatus is unable to print.

The image processing apparatus further includes a monitor that monitors a time length elapsed after the outputting section interrupts transfer of data to the printing apparatus, wherein when the time length elapsed exceeds a reference time length, the monitor determines that the printing apparatus is unable to print.

The image processing apparatus further includes an operating section through which an operator either inputs a desired value of the reference time length or selects a desired value from a plurality of values of the reference time length. The image processing apparatus further includes a recording section holds the desired value.

The image processing apparatus further includes a display section, wherein when the detecting section determines that the printing apparatus is unable to print, the display section displays a display indicative that the printing apparatus is unable to print. After the detecting section determines that the printing apparatus is unable to print, the detecting section continues to obtain a status of the printing apparatus to determine whether the printing apparatus has become unable to print. When the detecting section determines that the printing apparatus has become unable to print, the display section clears a display indicative that the printing apparatus is unable to print.

The image processing apparatus further includes a display section and an operating section. The display section displays a screen that prompts the operator to select either continuation of outputting of data to the printing apparatus or interruption of outputting of data to the printing section when the detecting section determines that the printing apparatus is unable to print. The image processing apparatus. The operator selects through the operating section either continuation of outputting of data to the printing apparatus or interruption of outputting of data the printing apparatus.

When the outputting section is outputting the data from the second memory to the printing apparatus, the data is not received from the host apparatus.

An image forming system includes a host apparatus, a printing apparatus, and an image processing apparatus. The host apparatus outputs print data. The printing apparatus prints the print data on a medium. The host apparatus and the printing apparatus are linked via the image processing apparatus. The image processing apparatus includes a first memory, a second memory, a data identifying section, a detecting section, and a cancel commanding section. The first memory stores data received from a host apparatus. The second memory stores data received from an original. The outputting section receives the data from the first memory and the second memory and outputs the data to a printing apparatus. The data identifying section identifies whether the data outputted from the outputting section is data from the second memory. The detecting section obtains a status of the printing apparatus and determines whether the printing apparatus is unable to print. The cancel commanding section outputs a command the printing apparatus to clear the data received from the outputting section when the printing apparatus is unable to print. When the printing apparatus receives a command for clearing the data in the printing apparatus, the printing apparatus clears the data received from the cancel commanding section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 1 is a block diagram of the present invention illustrating a general configuration of an image forming system that incorporates an image processing apparatus;

FIGS. 2A-2E illustrate a variety of messages displayed on a display of a scanner;

FIG. 3 illustrates the display and an operation section of the image processing apparatus;

DETAILED DESCRIPTION OF THE INVENTION

Figure 4:
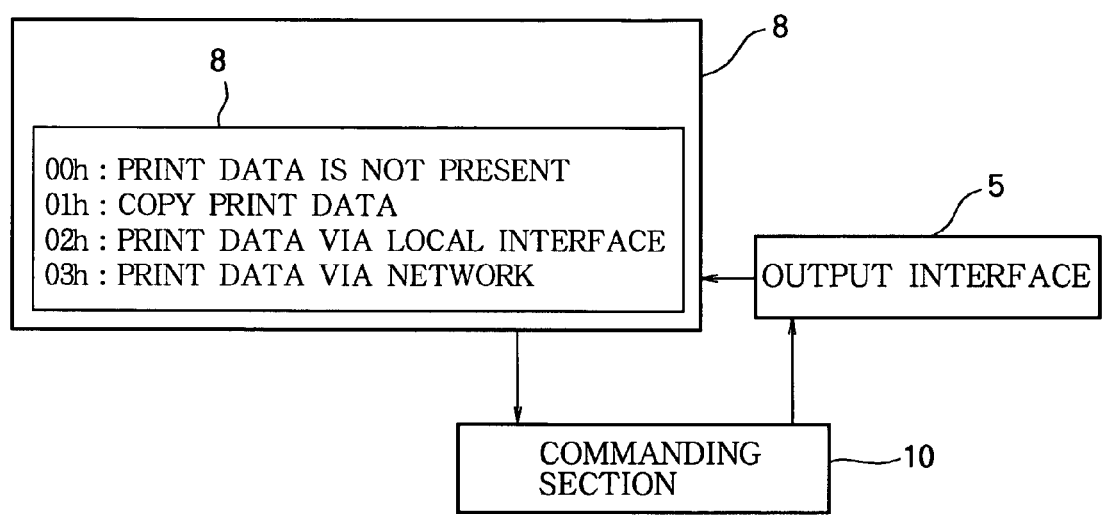
FIG. 4 illustrates an exemplary configuration of a data identifier of the image forming apparatus.

FIG. 1 is a block diagram of the present invention illustrating a general configuration of an image forming system that incorporates an image processing apparatus. Referring to FIG. 1, personal computers (PCs) 300 and 400 serve as a host apparatus that outputs print data. A printer 200 includes a data-receiving buffer 15 that stores data received from the host apparatus. The data in the data-receiving buffer 15 is read out and is printed. A scanner 100 serves as an image processing apparatus and is linked to the personal computer 300, personal computer 400, and printer 200.

A scanner 100 includes an original reading section 1, display 2, operation panel 3, image buffer 4, output interface 5, input interface 6, transfer data buffer 7, data identifier 8, printer status detector 9, cancel commanding section 10, transmitter identifier 11, memory 12 that stores transmitter identifying data, monitor 13, recorder 14, and controller 16. The monitor 13 monitors an elapsed length of a waiting time for data transfer. The recorder 14 holds a time-out value of the waiting time for data transfer.

The original reading section 1 reads an original to acquire image data of the original. The display 2 displays various settings, the status of the apparatus, and results of operations. The operation panel 3 commands the execution, halt, and setting of various functions. The image buffer 4 stores the image data that the original reading section 1 captures from the original. The output interface 5 takes the form of a USB2.0 interface, transfers data to the printer 200, and obtains the status of the printer 200. The interface 6 includes a USB2.0 interface (local interface) and an RJ45 network interface (network interface). The input interface 6 receives print data from the PC 400 and PC 300 and sends scanned data to the PC 400 and PC 300. The data identifier 8 identifies the print data that should be transferred to the printer 200. The printer status detector 9 detects the status of the printer 200 and checks the status to determine whether the printer 200 is able to print or unable to print. The cancel commanding section 10 outputs a command to the printer 200, causing the data in the data-receiving buffer 15 to be erased.

The transmitter identifier 11 obtains identification information on the print data received from the personal computers 300 and 400. The memory 12 stores the identification information that the transmitter identifier 11 obtained from the personal computers 300 and 400. When the data is being transferred, the monitor 13 monitors the time required for data transfer, i.e., waiting time for data transfer. Waiting time for data transfer is a time length for which the system halts when the data is being transferred. If no data transfer takes place for a predetermined length of waiting time, the monitor 13 determines that the printer 200 cannot print, i.e., the printer 200 is unable to print. The recorder 14 holds the time-out value that is used in the monitor 13. Time-out value is a maximum tolerable length of the waiting time for data transfer that the system can wait. The controller 16 controls overall operations of the respective sections in the scanner 100.

FIGS. 2A-2E illustrate a variety of messages displayed on the display 2 of the scanner 100. FIG. 2A illustrates a message when a copying operation has completed normally. FIG. 2B illustrates a message when a copying operation fails due to the fact that the printer 200 is unable to print. FIG. 2C illustrates a message when a PC print operation fails due to the fact that the printer 200 is unable to print. FIG. 2D illustrates a display screen that allows the operator to select either to continue or to interrupt a copying operation. FIG. 2E illustrates a display screen that allows the operator to select either to continue or to interrupt a copying operation. FIG. 3 illustrates the display 2 and the operation section 3 of the image processing apparatus 100. Referring to FIG. 3, the operation panel 3 includes a ten key 3a through which numerical values are input, CANCEL button 3b for canceling a variety of settings, cursor key 3c for switching from menu to menu and selecting a desired setting menu, SELECT button 3d for making selected values permanent, MENU button 3e for moving from one menu to another, COPY button 3f for shifting to a copying mode, SCAN/SEND TO button 3g for moving to "scan-to-network mode" where images are transferred via the network, START button 3h for carrying our a copying operation or scan-to-network, and STOP button 3i for halting.

FIG. 4 illustrates an exemplary configuration of the data identifier 8 of the image forming apparatus 100. The data identifier 8 includes a register 8a that holds one of values "00H" "01H", "02H", and "03H" as a data identification of data identified by the data identifier 8. The register 8a holds the data identification of only the print data that is currently being transferred.

First Embodiment

Figure 5:
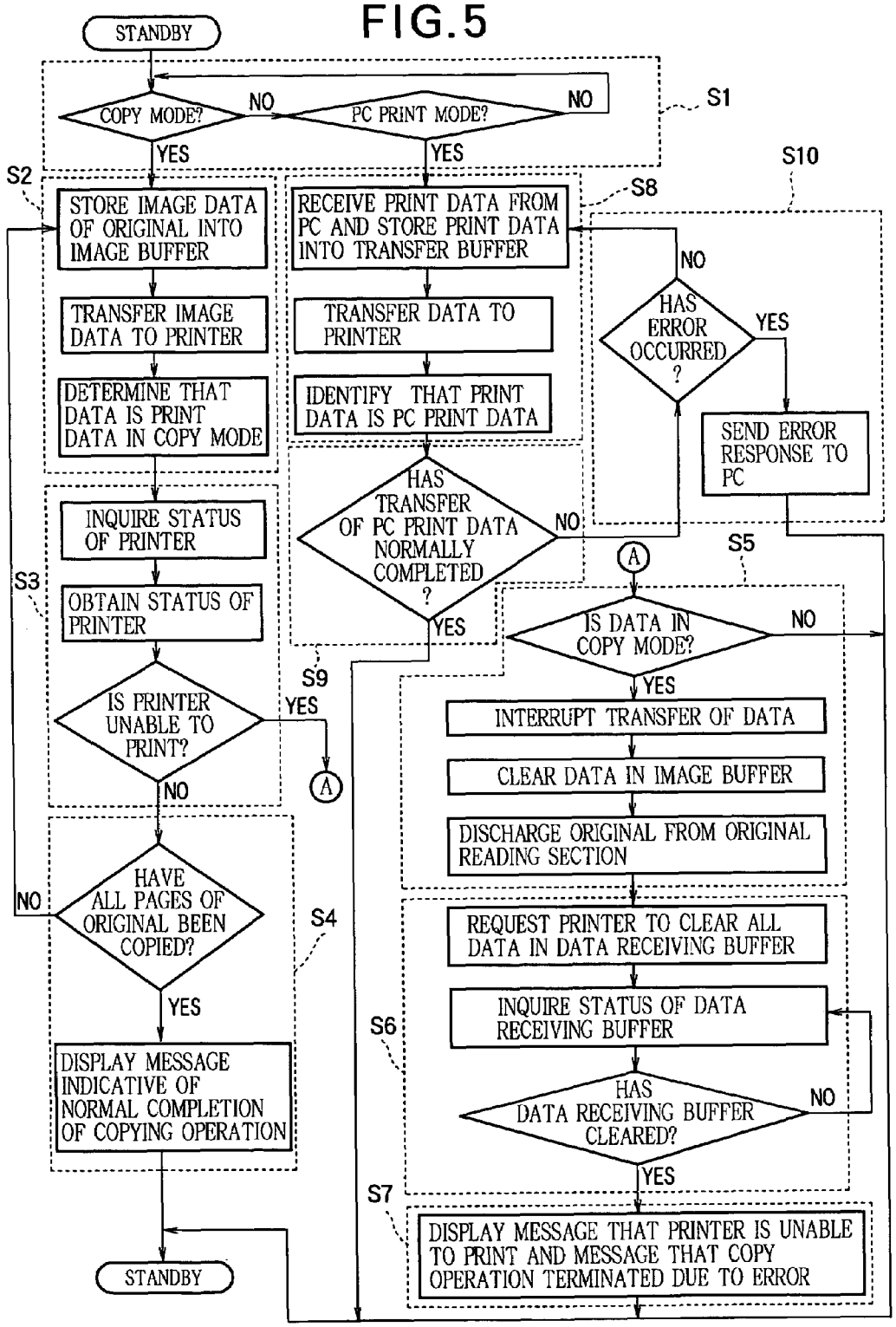
FIG. 5 is a flowchart illustrating the operation of the scanner according to a first embodiment.

FIG. 5 is a flowchart illustrating the operation of the scanner 100 according to a first embodiment. Initially, the scanner 100 is in its standby state where the scanner 100 waits for a copy command from the operation panel 3 or for print data from the input interface 6 (step S1). The operation of the scanner includes two modes: a copying mode in which a copy of an original is made and a PC printing mode in which data from a personal computer is printed.

When a user inputs a command from the operation panel 3 commanding initiation of a copying operation, the original reading section 1 starts to read an original. Then, the original reading section 1 stores the thus read image data into the image buffer 4, the image data being copy print data, i.e., print data in the copying mode. The print data is then transferred from the image buffer 4 to the printer 200 via the output interface 5. The data identifier 8 determines that the data output from the image buffer 4 to the printer 200 is print data in the copying mode. Then, the data identifier 8 stores "01H" into the data identifier 81, the "01H" indicating that the data is the copy print data (step S2).

During data transfer, the printer status detector 9 inquires the printer 200 of the status of the printer 200, and checks the status of the printer 200 to determine whether the printer 200 is unable to print (step S3). For example, if the status of printer 200 is "paper-out," "paper jam," or "printer cover opened," then it is determined that the printer 200 is unable to print. If the status of printer 200 is "paper-out," "exhaustion of consumable items," "paper jam," or "printer cover opened," then it is determined that the printer 200 is unable to print.

If the printer 200 is unable to print, then the program loops back to step S2 to repeat steps S2 and S3 until all pages of the original have been copied. When all pages of the original have been copied, the display 2 displays a message indicative of the normal completion of the copying operation and then enters a standby state (step S4). FIG. 2A illustrates an example of the message.

When the data in the copying mode is being transferred, if it is determined that the printer 200 is unable to print, the scanner 100 interrupts the transfer of print data, clears all the image data held in the image buffer 4, and discharges the original that remains in the original reading section 1 (step S5).

When the image buffer 4 has been cleared and the original has been discharged, the controller 16 causes the cancel commanding section 10 to request the printer 200 to clear all the data held in the data-receiving buffer 15. The scanner 100 continues to inquire the status of the data-receiving buffer 15 until the content of the data-receiving buffer 15 has been cleared (step S6).

After having checked that the data-receiving buffer 15 has been cleared, the scanner 100 causes the display 2 to display a message indicating that the copying operation has been terminated due to an error and a message indicating that the printer 200 is unable to print (step S7). FIG. 2B illustrates examples of the messages.

When the scanner 100 is in the standby state and the input interface 6 receives print data (i.e., PC print data) from a personal computer (PC 300 or PC 400), then the input interface 6 stores the received PC print data into the transfer data buffer 7. Subsequently, the scanner 100 starts to transfer the PC print data held in the transfer buffer 7 to the printer 200 via the output interface 5. Thus, the data identifier 8 identifies that the print data output from the transfer buffer 7 to the printer 200 via the output interface 5 is PC print data. Thus, the data identifier 8 stores into the register 8a either the data identification "02H" indicative of local interface print data (print data from PC 300) or data identification "03H" indicative of network print data (print data from PC 400) (step S8).

When the transfer of the PC print data has completed normally, the scanner 100 enters the standby status (step S9). If an error occurs in the printer 200 during the transfer of the PC print data and therefore the normal transfer fails, then the scanner 100 receives an error response from the printer 200 via the output interface 5. Then, the scanner 100 sends the error response through the input interface 5 to a personal computer from which the PC print data is received (step S10).

Figure 6:
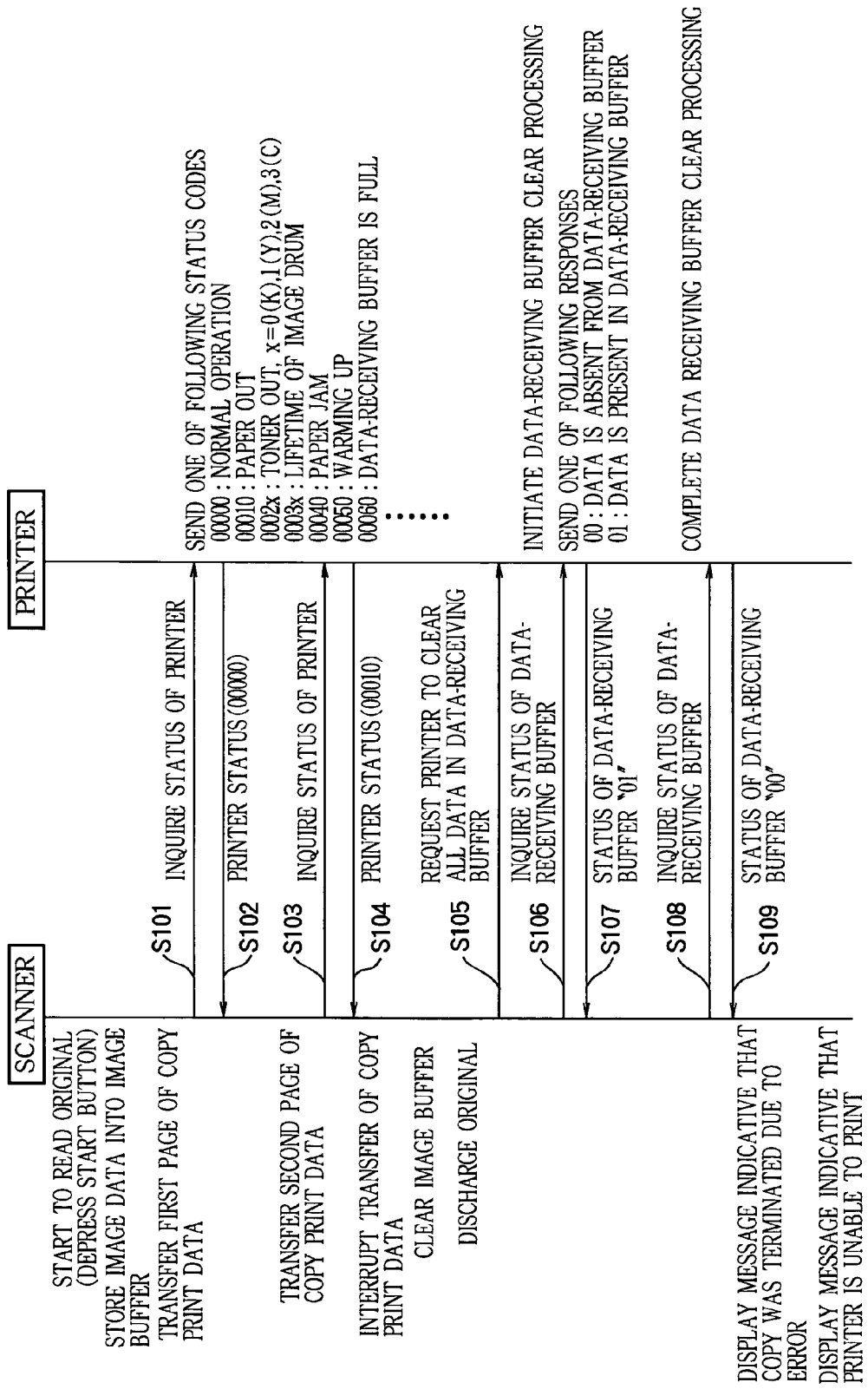
FIG. 6 illustrates an example of an operation sequence when a printer becomes unable to print during a copying operation.

FIG. 6 illustrates an example of an operation sequence when the printer 200 becomes unable to print during a copying operation. Referring to FIG. 6, USB bulk transfer is used for transferring the copy print data and USB control transfer is used for obtaining the status of the printer 200, the status of the data-receiving buffer 15 and for sending a buffer-clearing request. The use of USB bulk transfer and USB control transfer allows the status of the printer 200 to be obtained during the transfer of the copy print data.

Referring to FIG. 6, the scanner 100 initiates to read an original (i.e., START button 3h is depressed), stores the image data into the image buffer 4, and inquires the printer 200 of the status of the printer 200 after the copying operation of the first page has begun (step S101).

In response to the inquiry, the printer 200 sends to the scanner 100 a status code that corresponds to a current status of the printer 200 (step S102). The status codes include the following.

00000: normal operation
00010: paper out

0002x: toner out, x=0 (black toner out), x=1 (yellow toner out), x=2 (magenta toner out), and x=3 (cyan toner out), 0003x: lifetime of image drum, x=0 (black image drum reached its lifetime), x=1 (yellow image drum reached its lifetime), x=2 (magenta image drum reached its lifetime), x=3 (cyan image drum reached its lifetime)

00040: paper jam

00050: warming up

00060: receiving buffer is full of data

In response to the inquiry at step S101, the printer 200 sends status code 00000 (normal operation) to the scanner 100.

When the scanner 100 receives status code "00000 (normal operation)" at step S102, the scanner determines that the printer 200 is unable to print, and thus continues to transfer the first page of the copy print data. Likewise, upon initiating the transfer of the copy print data for the second page, the scanner 100 inquires the printer 200 of the status of the printer 200 (step S103).

In response to the inquiry of step S103, the printer 200 sends the status code "00010 (paper out)", assuming that paper is exhausted (steps S104).

When the scanner 100 receives the status code "00010 (paper out)", the scanner 100 determines that the printer 200 is unable to print. Thus, the scanner 100 interrupts the transfer of the copy print data, clears all the image data held in the image buffer 4, discharges the original remaining on the original reading section 1, and finally sends a buffer-clearing request to the printer 200 (step S105). Thereafter, the scanner 100 inquires the status of the data-receiving buffer 15 (step S106).

Upon receiving the buffer-clearing request, the printer 200 initiates a buffer-clearing processing of the data-receiving buffer 15. In response to the inquiry for the status of the data-receiving buffer 15, the printer 200 sends one of the following responses: "00" (data is absent from the data-receiving buffer 15) and "01" (data is present in the receiving buffer) to the scanner 100 (step S107).

Upon receiving the response "01" (data is present in the data-receiving buffer 15), the scanner 100 determines that the buffer-clearing processing has not completed, and again inquires the printer 200 of the status of the data-receiving buffer 15 (step S108).

The printer 200 has completed the buffer-clearing processing before receiving the inquiry at step S108, and sends the response "00" (data is absent from the data-receiving buffer 15) to the scanner 100 (step S109).

Upon receiving the status code "00" at step S109, the scanner 100 determines that the buffer-clear processing has been completed. Then, the scanner 100 causes the display 2 to display a message indicating that the copying operation was terminated due to an error and a message indicating that the printer 200 is unable to print.

Figure 7:
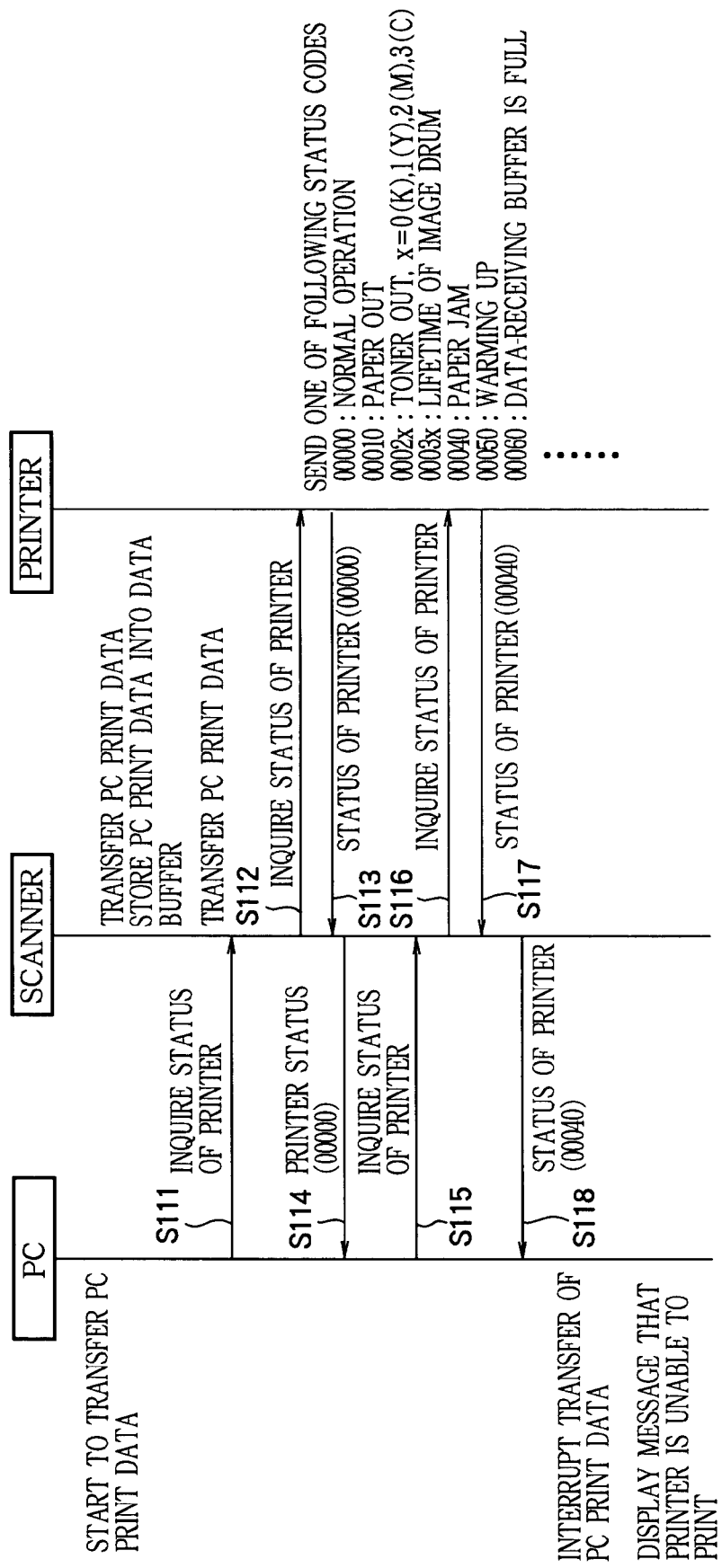
FIG. 7 illustrates an example of an operation sequence when the printer becomes unable to print during a PC printing operation.

FIG. 7 illustrates an example of an operation sequence when the printer 200 becomes unable to print during a PC printing operation. It is assumed that a personal computer (either PC 300 or PC 400) monitors the status of the printer 200 during the PC printing operation. The scanner 100 receives an inquiry for the status of the printer 200 from a personal computer, and sends the inquiry to the printer 200. Then, the scanner 100 receives the status of the printer 200 from the printer 200, and transfers the status to the personal computer. The status codes and responses in FIG. 7, sent from the printer 200, describe the same status information as those in FIG. 6.

Referring to FIG. 7, when a personal computer initiates to transfer PC printing data to the scanner 100, the scanner 100 stores the PC printing data into the transfer data buffer 7. Then, the scanner 100 begins to transfer the PC printing data to the printer 200, the personal computer inquires the scanner 100 of the status of the printer 200 (step S111).

Upon receiving the inquiry from the personal computer, the scanner 100 inquires the printer 200 of the status of the printer 200 (step S112).

In response to the inquiry of step S112, the printer 200 sends the status code "00000 (normal operation)" to the scanner 100 (step S113)

Upon receiving the status code "00000 (normal operation)" of step S113, the scanner 100 transfers the status code to the personal computer (step S114).

Upon receiving the status code "00000 (normal operation)" of step S114, the personal computer determines that the printer 200 is able to print, and continues to transfer the PC printing data. Then, the personal computer inquires the scanner 100 of the printer 200 of again (step S115).

In response to the inquiry of step S115, the scanner 100 inquires the printer 200 of the status of the printer 200 again (step S116).

In response to the inquiry of step S116 from the personal computer, the printer 200 sends the status code "00040 (paper jam)" to the scanner 100, assuming that paper jam has occurred (step S117).

Upon receiving the status code "00040 (paper jam)" of step S117, the scanner 100 transfers the status code to the personal computer (step S118).

Upon receiving the status code "00040 (paper jam)" of step S118, the personal computer determines that the printer 200 is unable to print. Then, the personal computer interrupts the transfer of the PC print data and causes the display 2 to display a message indicating that the printer 200 is unable to print.

As described above, when the printer 200 cannot print due to exhaustion of consumable items such as paper during a copying operation, such a case can be detected on the scanner 100 side. This allows the image buffer 4 and data-receiving buffer 15 to be cleared and the original remaining in the original reading section 1 to be discharged. Thus, when abnormality occurs in the printer 200, the image forming system can be recovered promptly from the failure caused by the abnormality on the printer side. In addition, a function such as network scan may be applied to the image forming system.

During the normal PC printing operation, PC print data received from PC 300 or PC 400 is sent from an unknown person different from the person who attempts to make a copy of an original. During the copying operation, copy print data is read from an original owned by the person who attempts to make a copy of the original. The transmitter identifier 11 identifies whether the data was transmitted from the PC 300 or PC 400 or the data was read from an original during the copying operation. Then, the cancel commanding section 10 outputs a command to the printer 200 causing the data in the received data buffer 15 to be erased. Thus, this configuration prevents inadvertent erasure of the data received from an unknown person via the personal computer PC 300 or PC 400.

Second Embodiment

A second embodiment differs from the first embodiment in that a monitor 13 has an additional function of checking the status of a printer 200.

Figure 8:
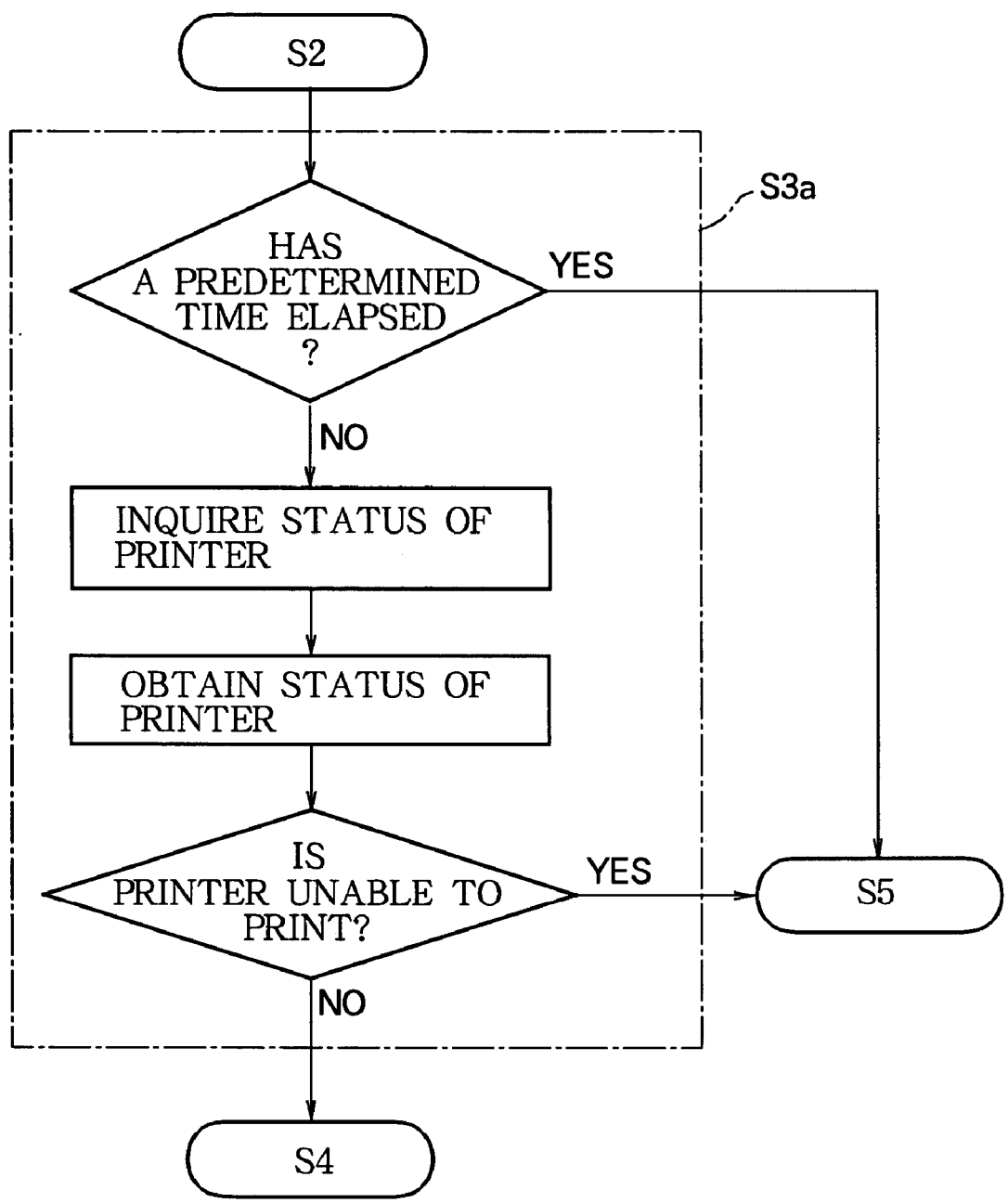
FIG. 8 is a flowchart illustrating the operation of the scanner that corresponds to an additional function of checking the status of the printer.

FIG. 8 is a flowchart illustrating the operation of a scanner 100 that corresponds to the additional function of checking the status of the printer 200. The same steps as those in FIG.

5 have been given the same step numbers. The operation of the second embodiment (FIG. 8) differs from that of the first embodiment (FIG. 5) in that step S3a is used in place of step S3.

A portion of the operation of the second embodiment different from that of the first embodiment will be described. During the transfer of the copy print data, the monitor 13 monitors the waiting time for data transfer. If no data transfer takes place for a predetermined time length, i.e., a time-out value of the waiting time for data transfer, then the monitor 13 determines that the printer 200 is unable to print. If data transfer is being carried out normally without "time-out" condition, the printer status detector 9 inquires the printer 200 of the status of the printer 200, and checks the status of the printer 200 to determine whether the printer 200 is unable to print (step S3a).

The aforementioned time-out condition takes place when the printer 200 is unable to receive the copy print data due to the fact that a data-receiving buffer 15 is full of data, the entire system is warming up, or the system is in a busy state or in an off-line state. Once the time-out condition takes place, the printer 200 cannot continue to perform the copying operation. Thus, when the monitor 13 determines that the printer 200 is unable to continue to print, the controller 16 performs the same operation as when the printer status detector 9 detects that the printer 200 is unable to print.

Figure 9:
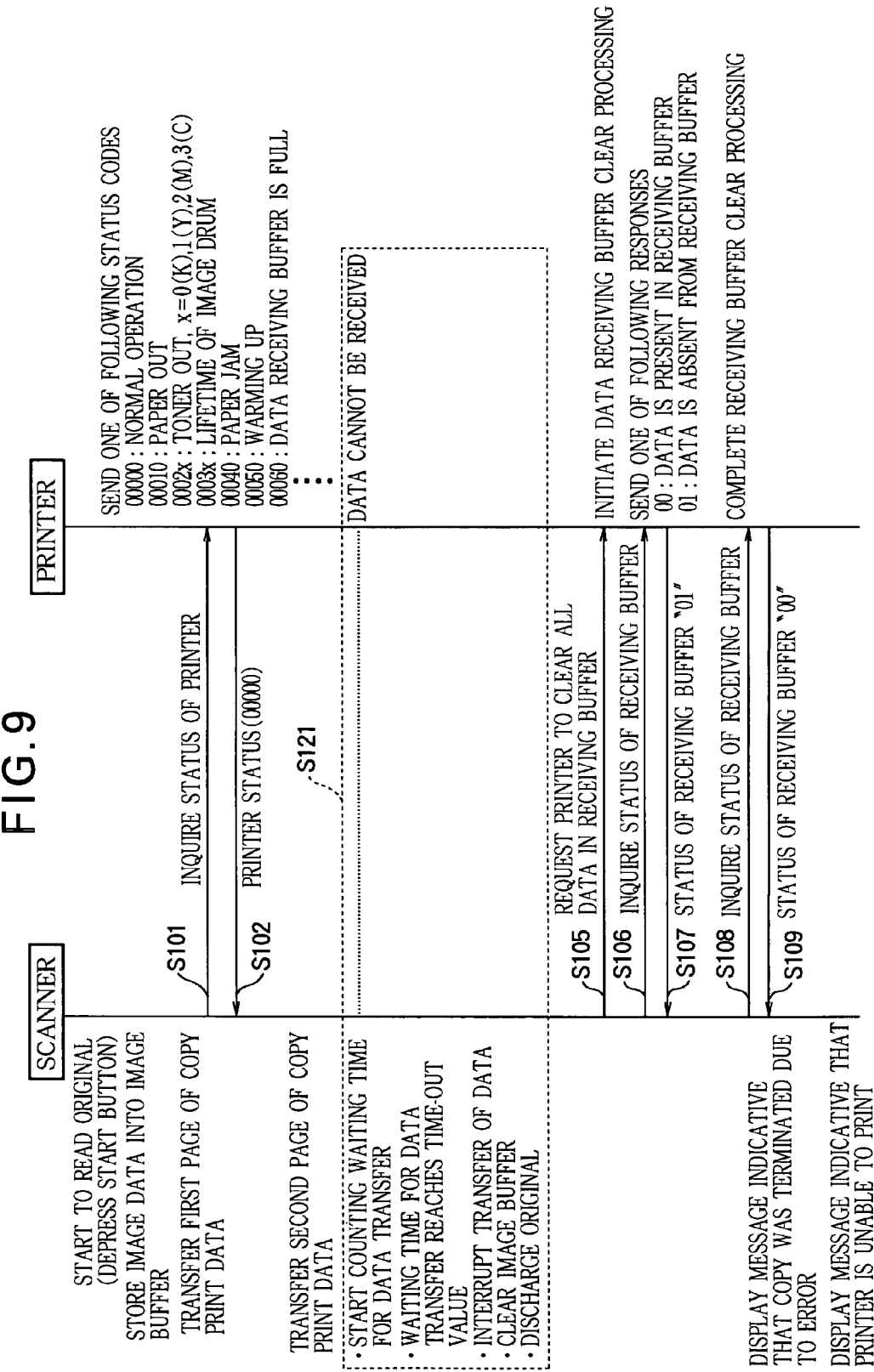
FIG. 9 illustrates an example of an operation sequence in a second embodiment.

FIG. 9 illustrates an example of operation sequence in the second embodiment. Referring to FIG. 9, USB bulk transfer is used for transferring the copy print data and USB control transfer is used for obtaining the status of the printer 200, the status of the data-receiving buffer 15, and for sending a buffer-clearing request. The use of USB bulk transfer and USB control transfer allows the buffer-clearing request to be sent even though the printer 200 is unable to receive the copy print data. The example in FIG. 9 is such that the time-out condition due to the stoppage of data transfer takes place not during the transfer of the copy print data for the first page but during the transfer of the copy print data for the second page. The same steps as those in FIG. 6 have been given the same step numbers. The status codes and responses, sent from the printer 200, have the same contents as those in FIG. 6.

Referring to FIG. 9, when the copy print data for the second page is being transferred from the scanner 100 to the printer 200, the data-receiving buffer 15 may become full of data. If the data-receiving buffer 15 become full of data, the printer 200 becomes unable to receive the print data and the scanner 100 starts to count the waiting time for data transfer. When the waiting time for data transfer reaches the time-out value of the waiting time for data transfer, the scanner 100 determines that the printer 200 has become unable to print. Then, the scanner 100 interrupts the transfer of the copy print data, clears all the image data in the image buffer 4, and discharges the original from the original reading section 1 (step S121). Thereafter, the scanner 100 sends a buffer-clearing request to the printer 200 just as in the first embodiment in FIG. 6 (step S105).

Thus, even when the data-receiving buffer 15 becomes full of data, the aforementioned second embodiment is capable of determining that the printer 200 is unable to print, for example, before the timing at which the status of the printer 200 is acquired. Therefore, other functions may be given a higher priority.

Third Embodiment

A third embodiment allows the operator to set a value of time-out of the waiting time for data transfer.

Figure 10:
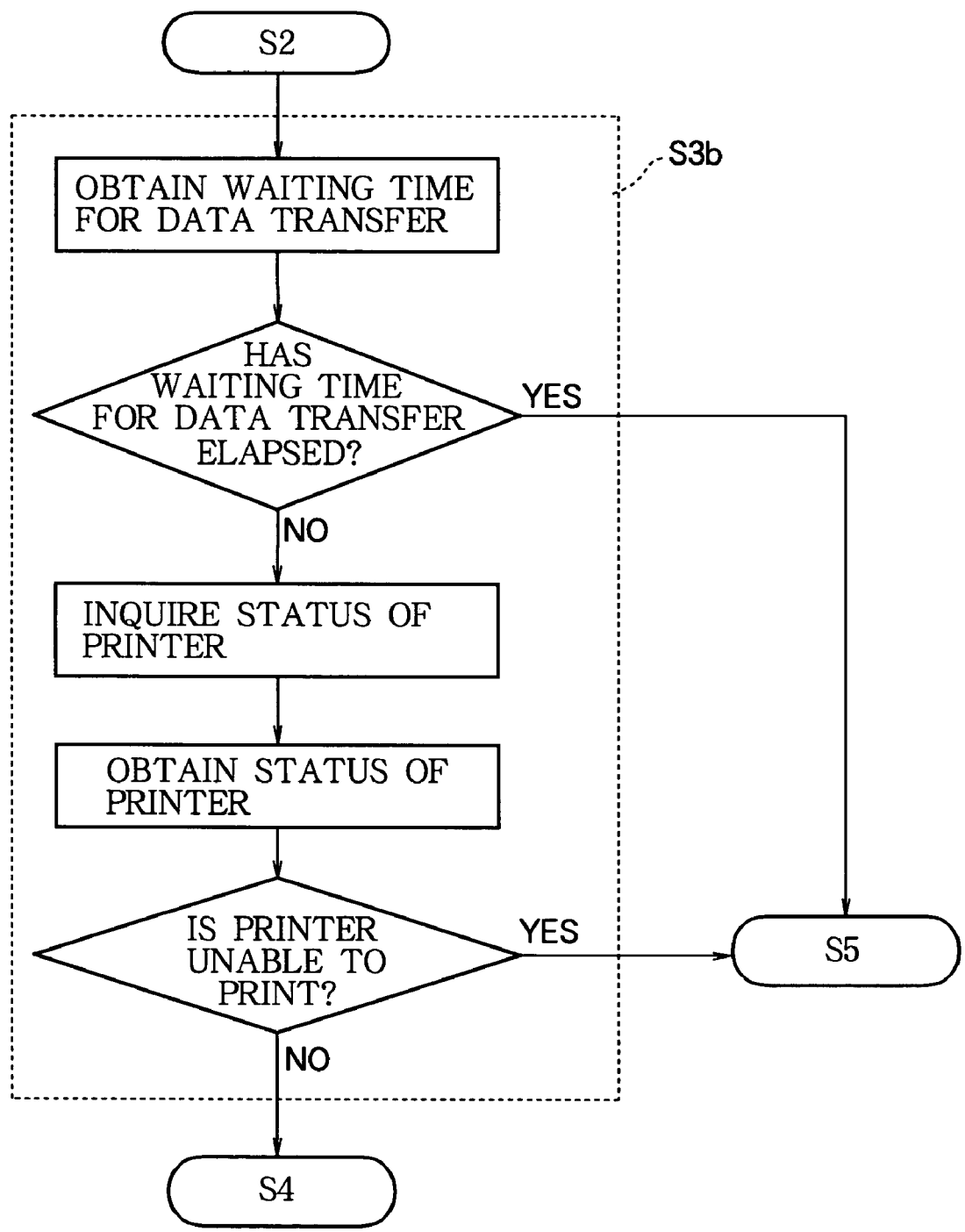
FIG. 10 is a flowchart illustrating the operation of a scanner according to a third embodiment.

FIG. 10 is a flowchart illustrating the operation of the scanner 100 according to a third embodiment. FIG. 10 shows a flow different from that of the first embodiment. The third embodiment differs from the first and second embodiments in that the step S3b is carried out in place of step S3 (FIG. 5)

Figure 11:
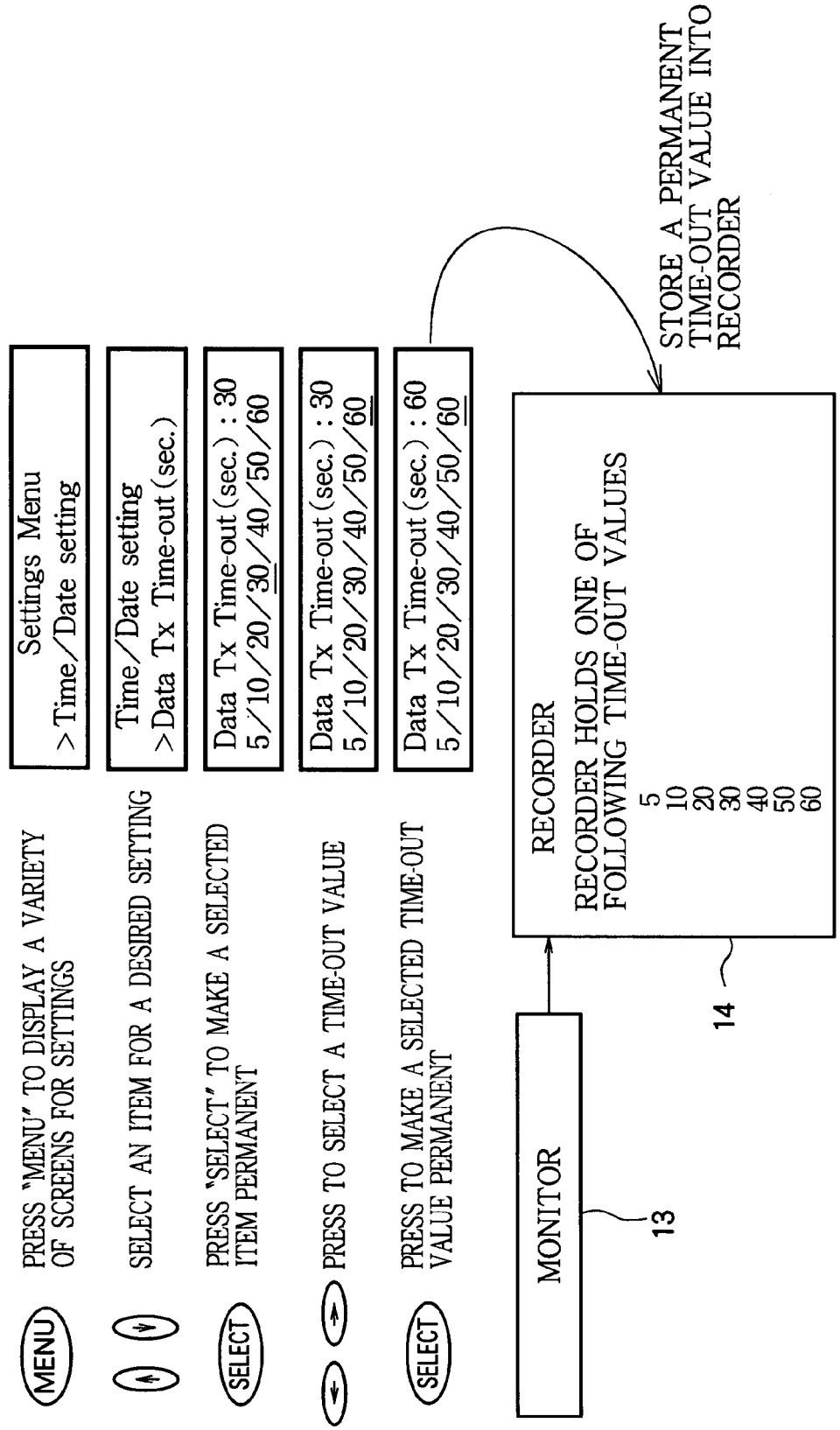
FIG. 11 is a timing chart illustrating an example of time-out value and an example in which a recorder is set to a time-out value of a waiting time for data transfer.

FIG. 11 is a timing chart illustrating an example of time-out value and an example in which a recorder 14 is set to a time-out value of the waiting time for data transfer. One of the time-out values of 5, 10, 20, 30, 40, 50, and 60 seconds is recorded into the recorder 14.

The operation of the third embodiment will be described in terms of the portion different from the first embodiment. The monitor 13 obtains from the recorder 14 the time-out value of the waiting time for data transfer, and monitors the waiting time for data transfer. If data transfer does not take place during the waiting time for data transfer, the printer status detector 9 determines that printer is unable to print. When data transfer is being performed normally, the printer status detector 9 inquires the printer 200 of the status of the printer 200 and checks the status of the printer 200 to determine whether the printer 200 is unable to print (step S3b).

By using the display 2 and operation panel 3, the operator is allowed to set the time-out value of the waiting time for data transfer. The time-out value of the waiting time for data transfer is registered into the recorder 14. A description will be given of the operation for setting the time-out value of the waiting time for data transfer and the operation for registering the time-out to the recorder 14. The operator first presses the MENU button 3e to cause the display 2 to display a variety of screens for settings, and then operates up- and down-arrow keys of cursor key 3c to select an item for setting the time-out value of the waiting time for data transfer. Thereafter, the operator presses the SELECT button 3d to confirm his selection. When the display 2 displays the values of 5, 10, 20, 30, 40, 50, and 60 seconds on the display screen, the operator operates the left and right keys of the cursor control keys 3c to select a desired one of these values. Then, the operator presses the SELECT button 3d to make the selected value permanent. In this example, "60" seconds is selected and is then made permanent. The aforementioned key operation enables storing of the permanent time-out value into the recorder 14. The settings may be in the form of numerals (e.g., 60 seconds) directly input by the operator or may be selected from among several numerals on the display 2.

The third embodiment may cause the warm-up time to change depending on the settings of the printer 200 but allows the operator to set a desired time-out value of the waiting time for data transfer in accordance with the settings of the printer 200. This offers the optimum value of time-out so that the printer 200 can be set to operator's desire.

Fourth Embodiment

A fourth embodiment differs from the third embodiment in that the status of a printer 200 can be detected during the transfer of PC print data just as during the transfer of copy print data.

Figure 12:
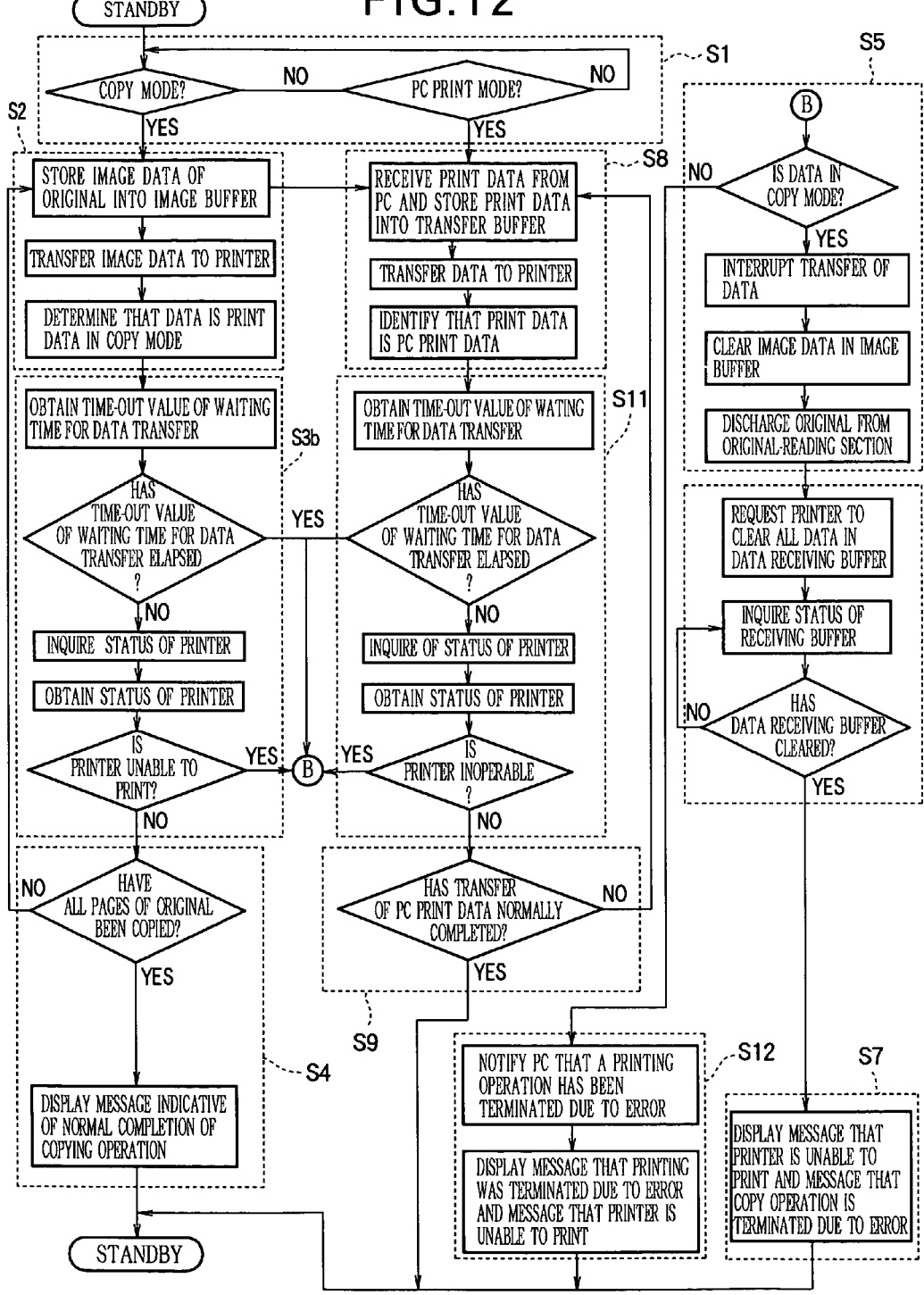
FIG. 12 is a flowchart illustrating the operation of a scanner according to a fourth embodiment.

FIG. 12 is a flowchart illustrating the operation of a scanner 100 according to the fourth embodiment. The same steps as those in FIG. 5 have been given the same step numbers. The operation of the fourth embodiment differs from the first embodiment in that step S10 is deleted, step S3b is employed in place of step S3, and additional steps S11 and S12 are employed.

The operation of the fourth embodiment will be described with respect to a portion different from the first embodiment.

A monitor 13 obtains a time-out value of the waiting time for data transfer from the recorder 14. When the PC print data is being transferred, the monitor 13 monitors the waiting time for data transfer. If the data transfer does not take place during the time-out value, the scanner 100 determines that the printer 200 is unable to print. If the data transfer is being carried out normally, the scanner 100 inquires the printer 200 of the status of the printer 200, and checks the status of the printer 200 to determine whether the printer 200 is unable to print (step S11).

The processing at step S9 of the fourth embodiment is performed in the same way manner as the first embodiment. Then, the program loops back to step S8 until the transfer of the PC print data has completed normally. The operation at step S12 corresponds to that performed at step S10 in the first embodiment.

If the scanner 100 determines, during the transfer of PC print data, that the printer 200 is unable to print, the scanner 100 sends a notification to a personal computer which sent a print request, the notification indicating that the printing operation has been terminated due to an error. The scanner 100 also sends a message to a display 2, the message indicating that the printer 200 is unable to print (step S12). FIG. 2C illustrates an example of this message.

Figure 13:
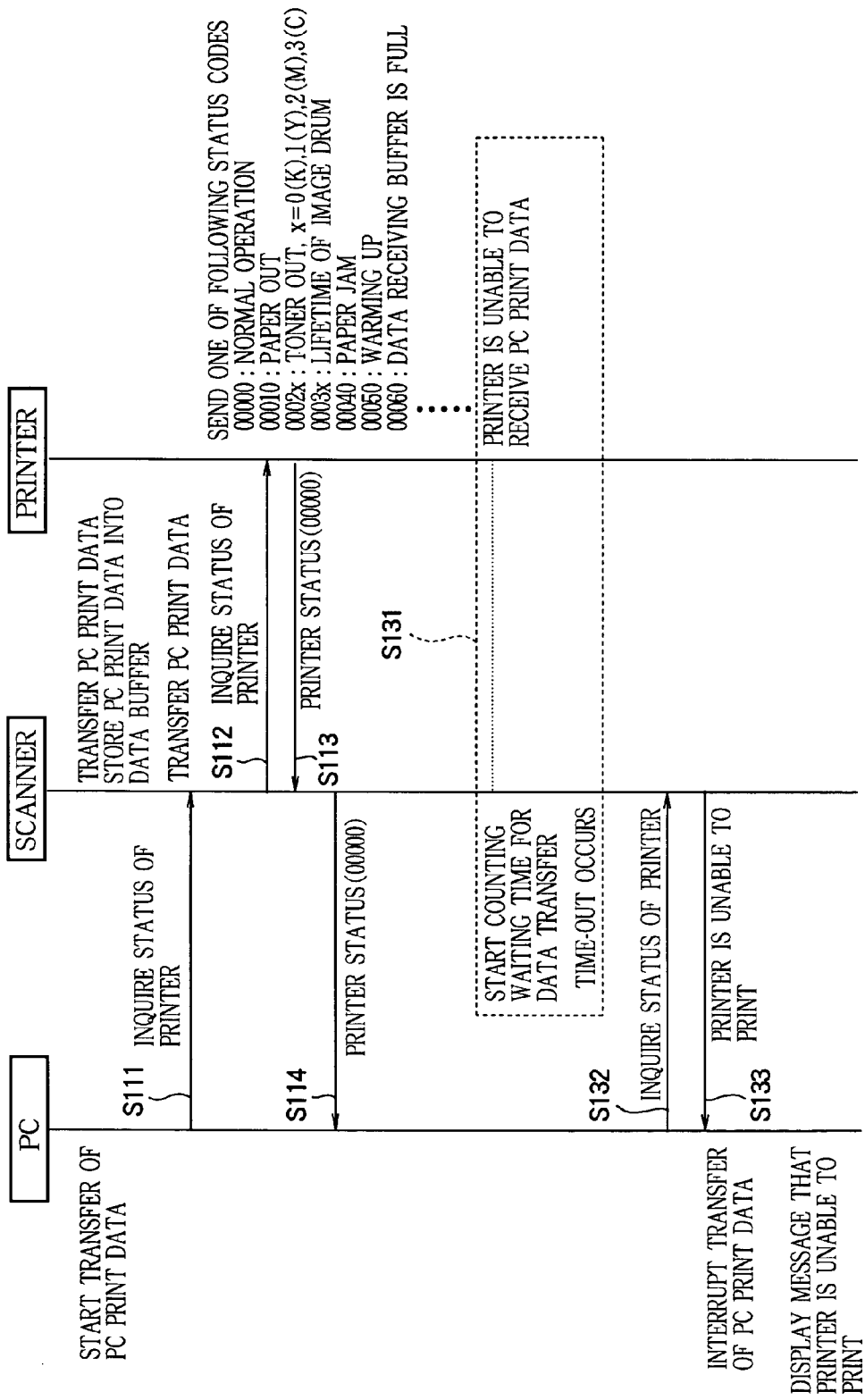
FIG. 13 illustrates an exemplary operation sequence when the printer becomes unable to print during a PC printing operation.

FIG. 13 illustrates an exemplary operation sequence when the printer 200 becomes unable to print during a PC printing operation. Referring to FIG. 13, the same steps as those in FIG. 7 have been given the same step numbers. In FIG. 13, the status codes and response, sent from the printer 200, describe the same status information as those in FIG. 6.

Referring to FIG. 13, the scanner 100 receives the status code "00000 (normal operation)" from the printer 200 during a PC printing operation at step S113 and transfers the status code "00000 (normal operation)" to the personal computers PC 300 or PC 400 at step S114. When the copy print data is being transferred from the scanner 100 to the printer 200, a data-receiving buffer 15 may become full of data. Thus, the printer 200 becomes unable to receive the print data and the scanner 100 starts to count the waiting time for data transfer. When the waiting time for data transfer reaches the time-out value, the scanner 100 determines that the printer 200 has become unable to print (step S131).

At step S132, upon receiving an inquiry of the status of the printer 200 from a personal computer after step S131, the scanner 100 notifies the personal computer that the printer 200 is unable to print and the printing has been terminated due to an error (step S133).

Upon receipt of the notification sent at step S133, the personal computer interrupts the transfer of the PC print data and causes its display screen to display a message that the printer 200 is unable to print. The scanner 100 also displays on the display 2 a message indicating that the printing has been terminated due to an error and a message indicating that the printer 200 is unable to print.

As described above, the fourth embodiment provides the following advantages in addition to those of the third embodiment. The scanner 100 can detect the status of the printer 200 even when the PC print data is being transferred. Therefore, even when the printer 200 becomes unable to print, the scanner 100 can send a notification to a personal computer that sent a print request, the notification indicating that the printer 200 is unable to print.

In the fourth embodiment, step S3b (FIG. 12) may be replaced with step S3 (FIG. 5) of the first embodiment or step S3a (FIG. 8) of the second embodiment. Likewise, step S11 may be replaced with step S3 or S3a.

Fifth Embodiment

A fifth embodiment differs from the fourth embodiment in that an operator is allowed to cancel a copy operation.

Figure 14:
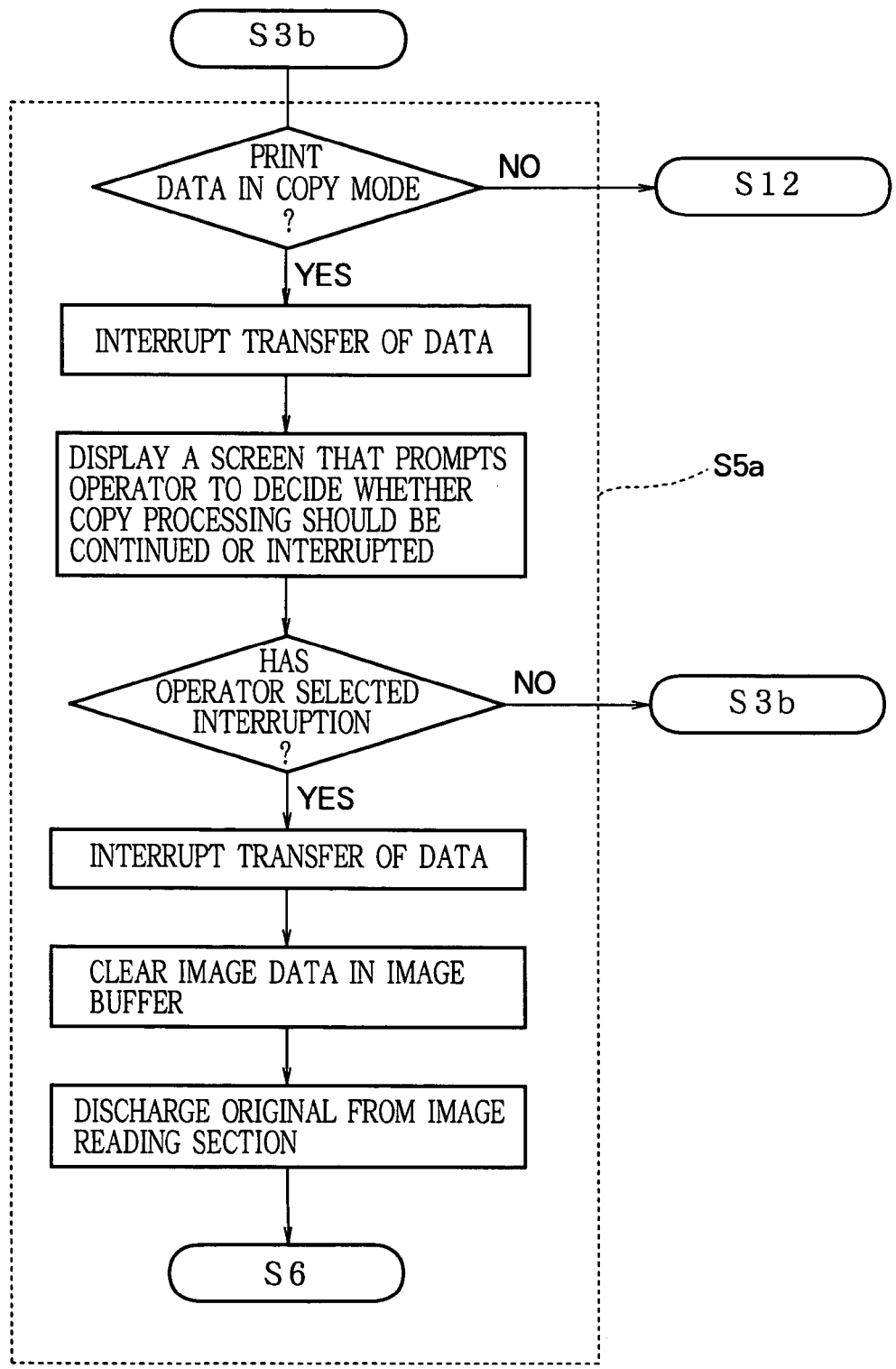
FIG. 14 is a flowchart illustrating the operation of a scanner according to a fifth embodiment.

FIG. 14 is a flowchart illustrating the operation of a scanner 100 according to the fifth embodiment. The operation of the fifth embodiment differs from the fourth embodiment in that step S5a (FIG. 14) is used in place of step S5 (FIG. 12).

The operation of the fifth embodiment will be described in terms of a portion different from the fourth embodiment. When the copy print data is being transferred, if the printer 200 becomes unable to print, the scanner 100 interrupts the transfer of data to the printer 200. Then, the display 2 displays a screen that prompts the operator to decide whether the copy operation should be continued or interrupted. If the operator selects continuation of the copy operation (i.e., the operator presses the START button 3h in FIG. 3), the scanner 100 returns to step S3b to check the status of the printer 200 again. Conversely, if the operator selects interruption of the copy operation (i.e., the operator presses the STOP button 3i in FIG. 3), the scanner 100 interrupts the transfer of the copy print data, then clears the image buffer 4 back to zero, and finally discharges the original from the original reading section 1 (step S5a). FIG. 2D illustrates an exemplary selection screen that allows the operator to select either continuation of the copy operation or interruption of the copy operation.

As described above, the fifth embodiment provides the following advantages in addition to those of the fourth embodiment. Abnormal conditions such as paper-out, paper jam, and the like may easily be restored by the operator. If such cases occur during a copy operation, the copy operation can be resumed to perform the remaining part of the copy operation after the restoration of the printer 200.

Sixth Embodiment

A sixth embodiment differs from the fifth embodiment in that the status of a printer 200 can be periodically obtained.

Figure 15:
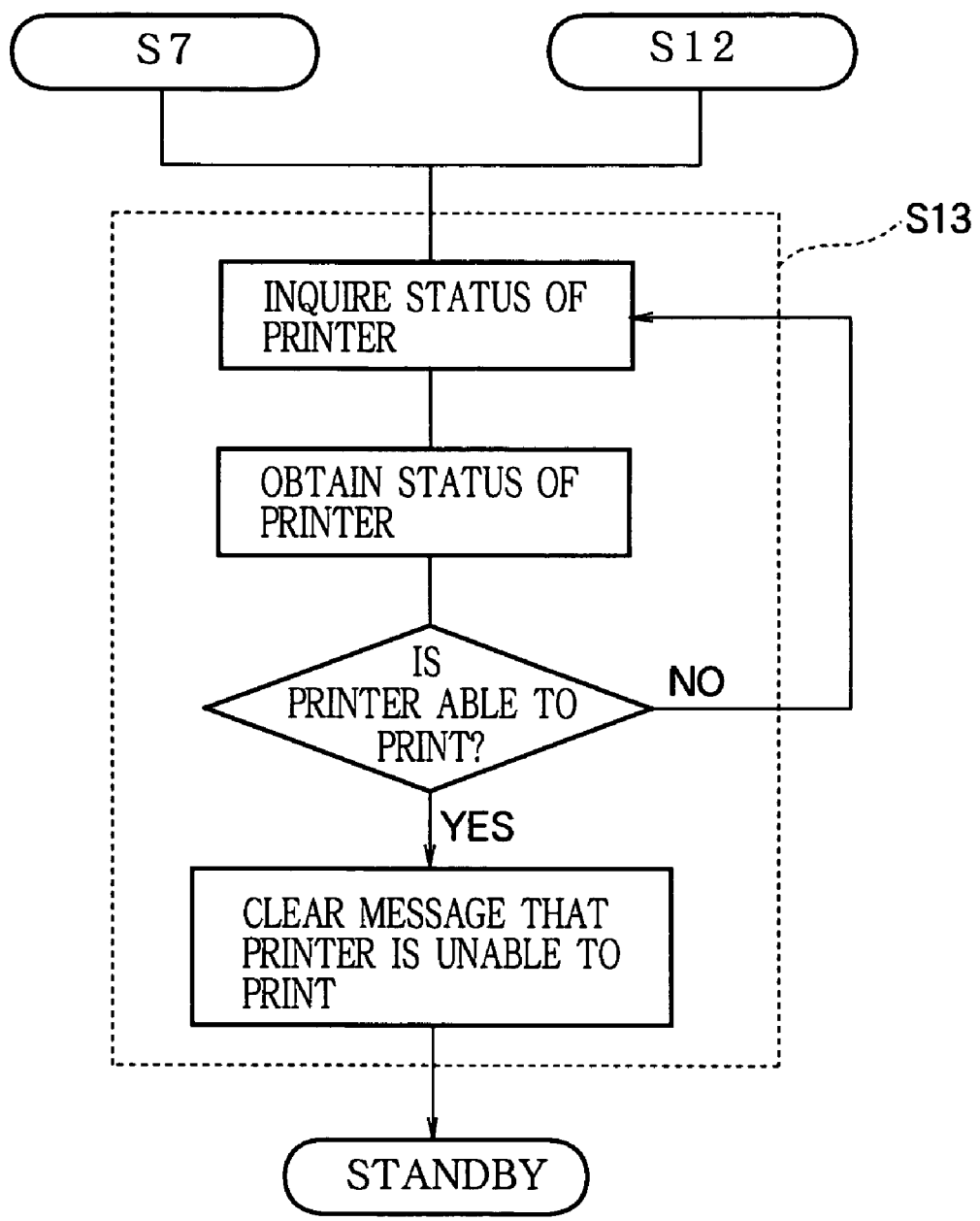
FIG. 15 is a flowchart illustrating the operation of a scanner according to a sixth embodiment.

FIG. 15 is a flowchart illustrating the operation of a scanner 100 according to the sixth embodiment. The operation of the sixth embodiment differs from the fifth embodiment in that step S5a (FIG. 14) is used in place of step S5 (FIG. 12) and step S13 (FIG. 14) is used.

The sixth embodiment will be described in terms of a portion different from the fourth embodiment. The status of the printer 200 of being unable to print results in an error termination of a copy operation at step S7 or an error termination of a PC print operation at step S12. Thus, the scanner 100 checks at predetermined intervals the status of the printer 200 by means of the printer status detector 9 to determine whether the printer 200 has recovered to the normal status. If the scanner 100 determines that the printer 200 has recovered to the status of being able to print, then the scanner 100 deletes the message indicative that the printer 200 is unable to print. Then, the scanner enters a standby state (step S13).

Figure 16:
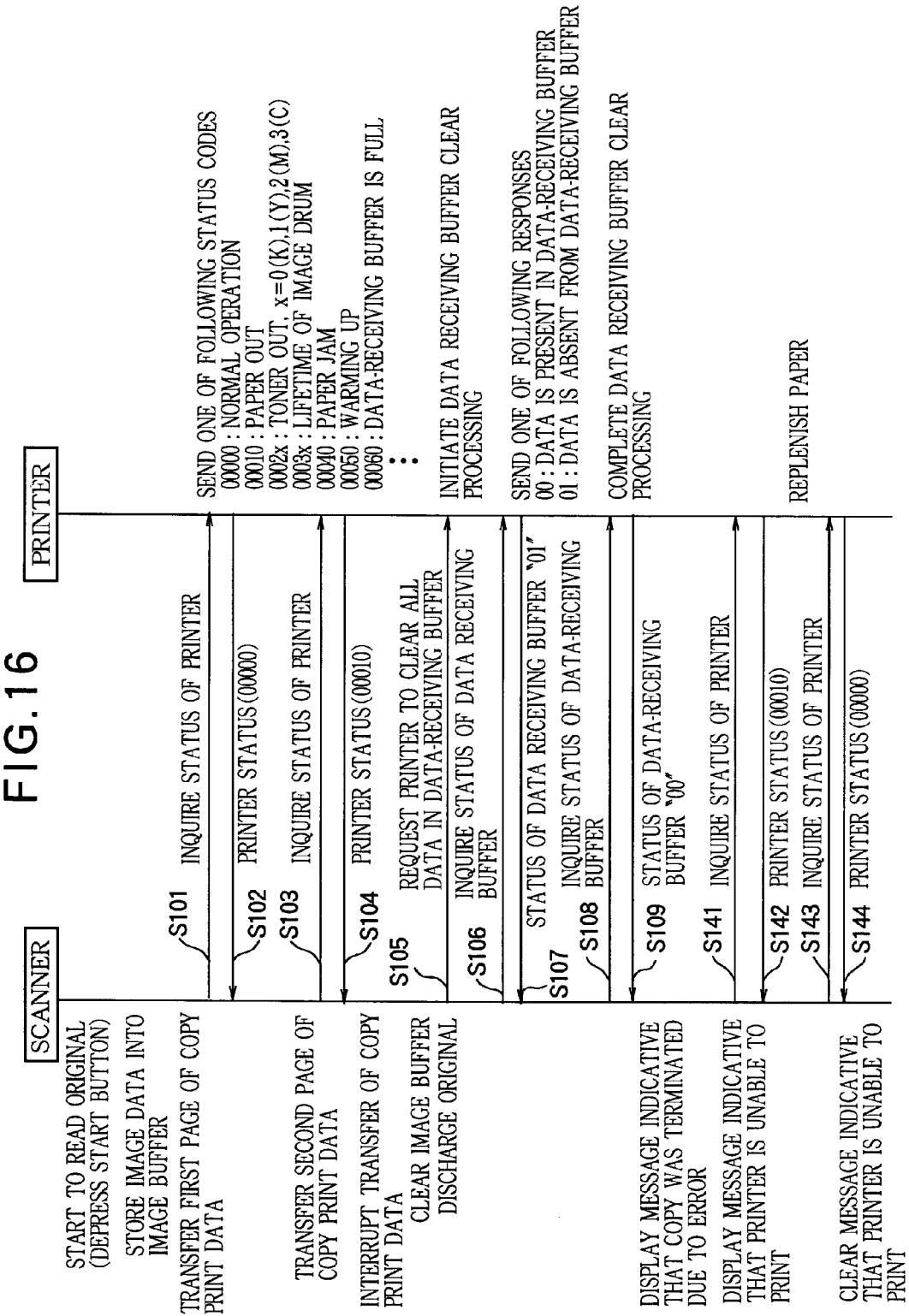
FIG. 16 illustrates an exemplary operation for checking the status of a printer according to the sixth embodiment.

FIG. 16 illustrates an exemplary operation for checking the status of the printer 200. FIG. 16 illustrates the sequence of checking the status of the printer when a copying operation is been performed. The same steps as those in FIG. 6 have been given the same step numbers. In FIG. 16, the status codes and responses, sent from the printer 200, describe the same status information as those in FIG. 6.

When the scanner 100 receives the response "00" (indicating that the data-receiving buffer 15 is empty of data), the scanner 100 determines that the buffer-clearing processing has been completed. Then, the scanner 100 displays on the display 2 a message indicative that the copying operation was terminated due to an error and a message indicative that the printer 200 is unable to print, and then inquires the status of the printer 200 (step S141).

Assuming that the paper has not been replenished by the time the printer 200 receives the inquiry sent at step S141, the printer 200 sends the status code "00010 (paper-out)" to the scanner 100 (step S142).

Upon receiving the status code "00010 (paper-out)," the scanner 100 determines that the printer 200 has not recovered from the status of being unable to print yet, and thus inquires the status of the printer 200 again (step S143).

The paper has been replenished by the time the printer 200 receives the inquiry of step S143. Thus, the printer 200 sends the status code "00000 (normal operation)" to the scanner 100 in response to the inquiry of steps S143 (step S144).

Upon receiving the status code "00000 (normal operation)" of step S144, the scanner 100 determines that the printer 200 has recovered from the status of being unable to print, and deletes a message indicative of being unable to print of the printer on the display 2.

As described above, the sixth embodiment provides the following advantages in addition to those of the fifth embodiment. When the printer becomes unable to print during the copy operation or PC printing operation and therefore printing is terminated due to an error, once the operator has restored the normal operation to the printer 200, the scanner 100 can detect that the printer 200 has recovered. This allows the scanner 100 to automatically delete the message on the display 2 indicative that the printer is unable to print, and then to enter the standby state.

Seventh Embodiment

A seventh embodiment differs from the sixth embodiment in that a transmitter identifier 11 obtains identification information on PC print data, so that only when a printer 200 becomes unable to print during a PC printing operation, the identification information is displayed to prompt the operator to decide whether printing should be continued or interrupted.

Figure 17:
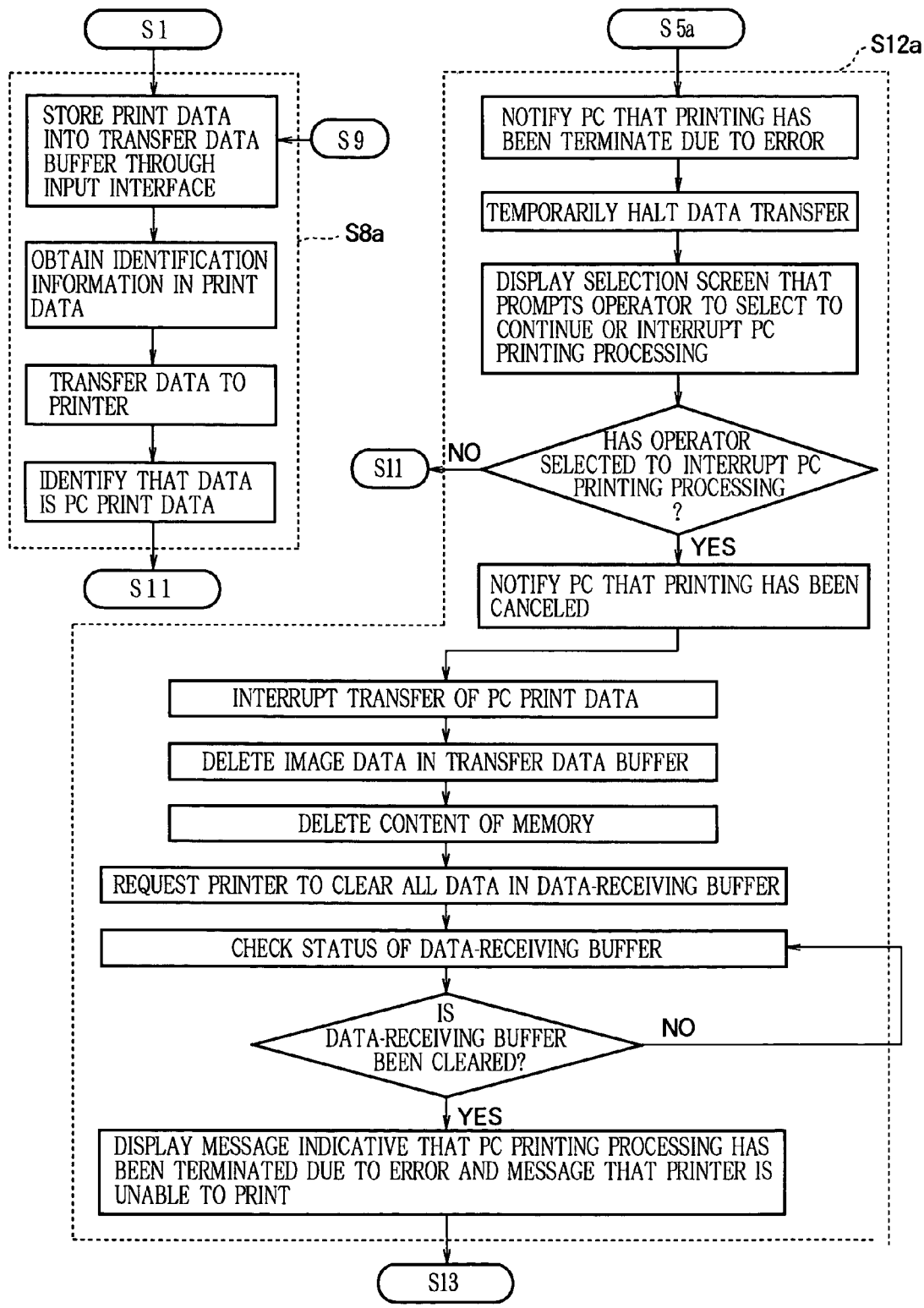
FIG. 17 is a flowchart illustrating the operation of a scanner according to a seventh embodiment.

FIG. 17 is a flowchart illustrating the operation of a scanner 100 according to the seventh embodiment. The seventh embodiment differs from the fourth to sixth embodiments in that steps S8a and S12a (FIG. 17) are employed in place of steps S8 and S12 (FIG. 12). The operation of the seventh embodiment also differs from that of the fourth embodiment in that step S5a (FIG. 14) is employed.

Figure 18:
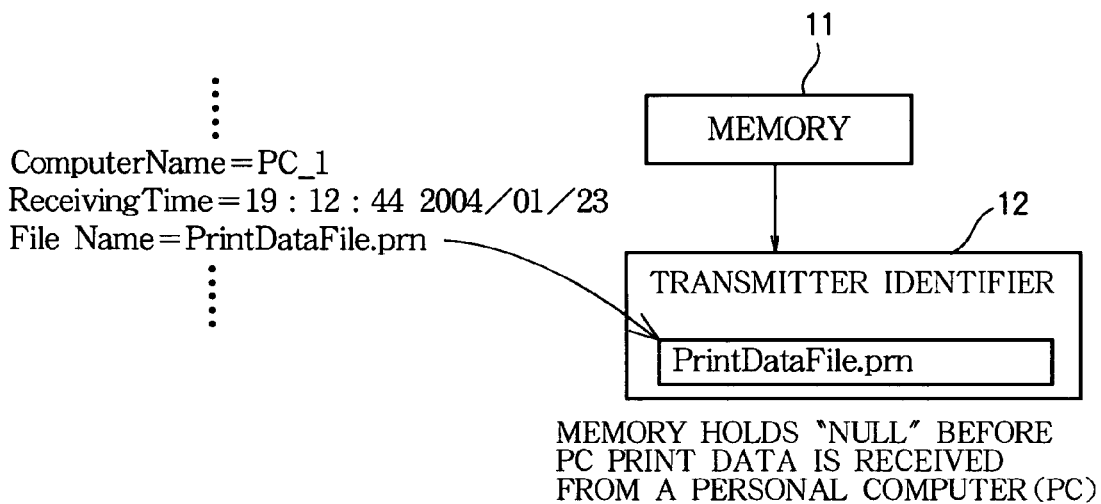
FIG. 18 illustrates an example of identification information stored in a memory of a scanner according to the seventh embodiment.

FIG. 18 illustrates an example of identification information stored in a memory 12 of the scanner 100 according to the seventh embodiment. Assume that the memory 12 stores a file name "PrintDataFile.prn" in FIG. 18 and it is possible to register only identification information on the print data that is being transferred.

The seventh embodiment will be described in terms of a portion different from the fourth embodiment. When the scanner 100 is in the standby state, if an input interface 6 starts to receive the print data from a personal computer PC 300 or a personal computer PC 400, a transfer data buffer 7 stores the received print data. The transmitter identifier 11 obtains "file name" as identification information contained in the print data, and stores the "file name" into the memory 12. Here, the identification information of the PC print data is the file name "PrintDataFile.prn" in FIG. 18 and is stored in the memory 12. Then, the scanner 100 starts transferring the PC print data from the transfer data buffer 7 to the printer 200 via an output interface 5. When the PC print data starts to be output from the transfer data buffer 7 to the printer 200 through the output interface 5, a data identifier 8 identifies that the data is PC print data, and stores "02H" or "03H" to the register 8a (step S8a). The "02H" indicates local interface print data (i.e., print data from PC 300) and the "03H" indicates network print data (i.e., data from PC 400).

When the PC print data is being transferred, if the scanner 100 determines that the printer 200 is unable to print, the scanner 100 temporarily halts the data transfer to the printer. Then, the display 2 displays a selection screen that prompts the operator to continue or interrupt the PC printing operation. If the operator selects to continue the PC printing operation, the program returns to step S11 where the scanner 100 checks the status of the printer 200 again. If the operator selects to interrupt the PC printing operation, the scanner 100 sends a notification to a personal computer that sent a print request, the notification indicating that the printing has been canceled. Then, the scanner 100 interrupts the transfer of the PC print data, deletes the image data held in the transfer data buffer 7, and deletes the content (i.e., file name of a file that is being printed) of the memory 12. Thereafter, the scanner 100 requests the printer 200 to cancel all the data stored in the data-receiving buffer 15, and continues to check the status of the data-receiving buffer 15 until the data-receiving buffer 15 is cleared back to zero. The scanner 100 checks that the data-receiving buffer 15 of the printer 200 has been cleared back to zero. Then, the display 2 displays a message indicative that the PC printing operation has been terminated due to an error and a message indicative that the printer 200 is unable to print (step S12a). FIG. 2E illustrates an example of a selection screen that allows the operator to select to continue or interrupt the PC printing operation.

Figure 19:
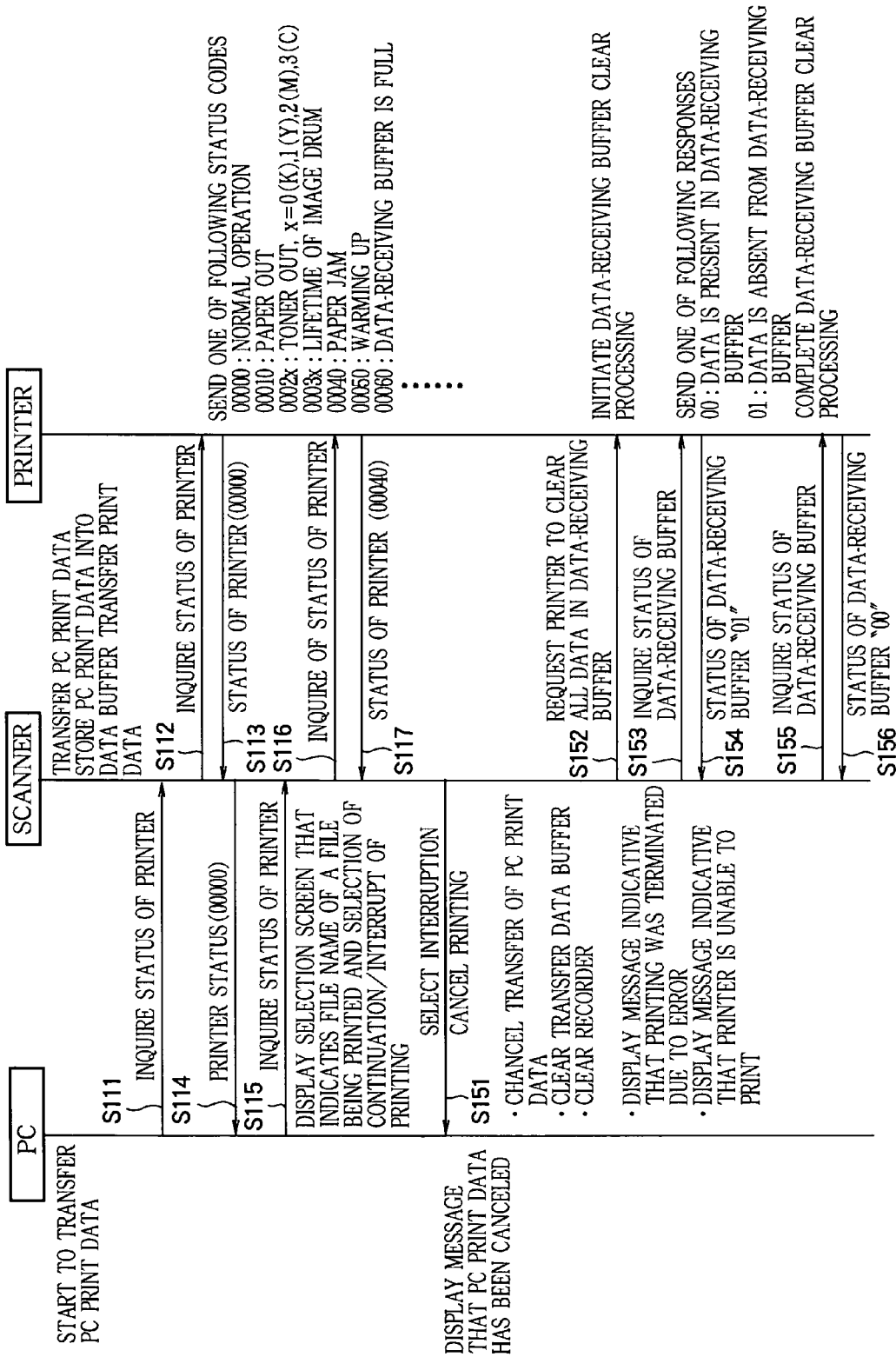
FIG. 19 illustrates an exemplary operation sequence when a PC printing operation is canceled.

FIG. 19 illustrates an exemplary operation sequence when a PC printing operation is canceled. The same steps as those in FIG. 7 have been given the same step numbers. The status codes and responses, sent from the printer 200, have the same contents as those in FIG. 6.

Upon receipt of the status code "00040 (paper jam)" of step S117, the scanner 100 determines that the printer 200 is unable to print, and halts the transfer of PC print data. Then, the scanner 100 causes the display 2 to display a selection screen that indicates a file name of a file and allows the operator to continue or interrupt the PC printing operation. Assuming that the operator selects to interrupt the PC printing operation through the selection screen, the scanner 100 sends a notification to the personal computer (PC 300 or PC 400) that sent a print request, the notification indicating that printing has been canceled (step S151). Upon receiving the notification, the personal computer displays a message indicative that the PC printing operation has been canceled.

The scanner 100 interrupts the transfer of the PC print data and deletes all the data held in the image buffer 4. Then, the scanner 100 deletes the content (i.e., file name of a file that is being printed) of the memory 12 and subsequently sends a buffer-clearing request to the printer 200 to clear the data-receiving buffer 15 (step S152). Thereafter, the scanner 100 inquires the status of the data-receiving buffer 15 (step S153)

Upon receipt of the buffer-clearing request of steps S152 from the scanner 100, the printer 200 starts to clear the data-receiving buffer 15. In response to the inquiry of step S153, the printer 200 sends the status code "01" (i.e., data is present in the receiving buffer 15) to the scanner 100 (step S154).

Upon receiving the response "01" of step S154, the scanner 100 determines that the data-receiving buffer 15 has not been cleared yet and inquiries the printer 200 the status of the receiving buffer 15 (step S155).

Because the data-receiving buffer 15 has been cleared back to zero before the inquiry of step S155 is received, the printer 200 sends the response "00" (data is absent from the receiving buffer 15) to the scanner 100 in response to the inquiry (step S156).

Upon receiving the status code "00", the scanner 100 determines that the data-receiving buffer 15 has been cleared. Then, the display 2 displays a message indicative that the PC printing operation has been terminated due to an error and a message indicative that the printer 200 is unable to print.

As described above, the seventh embodiment provides the following advantages in addition to those of the sixth embodiment. When the operator visits the printer 200 to pick up his print results, the display 2 indicates to the user that the user's print job has been terminated. Further, when the printer 200 has recovered from the status of being unable to print, the printing can be resumed from where the printing was interrupted. If the printer 200 is difficult to readily recover to its normal status, the printing may be stopped immediately.

Eighth Embodiment

An eighth embodiment differs from the seventh embodiment in that when a personal computer sends a print request to a printer 200 during a copying operation, the printer 200 notifies the personal computer that the printer 200 is busy.

Figure 20:
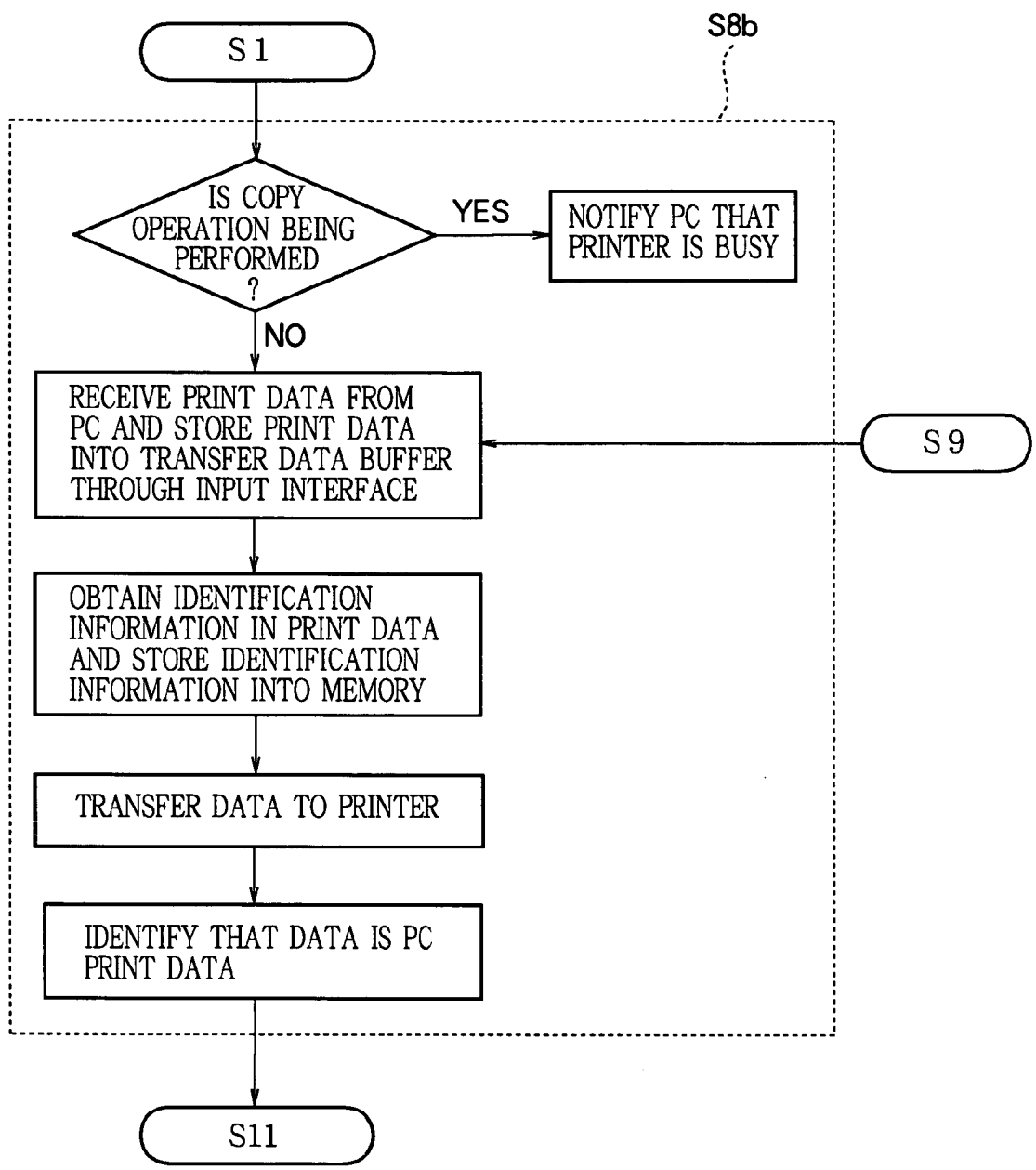
FIG. 20 is a flowchart illustrating the operation of a scanner according to an eighth embodiment.

FIG. 20 is a flowchart illustrating the operation of a scanner 100 according to the eighth embodiment, showing only a portion different from that of the seventh embodiment. The operation of the eighth embodiment differs from the seventh embodiment in that step S8*b* (FIG. 20) is used in place of step S8*a* (FIG. 17). Likewise, the eighth embodiment uses step S12*a* (FIG. 17) in place of step S12. The eighth embodiment uses step S13 (FIG. 15).

The eighth embodiment will be described in terms of a portion different from the seventh embodiment. When an input interface 6 receives print data from a personal computer, a scanner 100 checks the data registered in a register 8*a*, thereby checking whether a copying operation is being performed. If a copying operation is being performed, the scanner 100 notifies the personal computer that a printer 200 is busy, and stops receiving the PC print data. If a copying operation is not being performed, the program performs the same processing performed at step S8*a* in the seventh embodiment (FIG. 17) (step S8*b*).

As described above, the eighth embodiment provides the following advantages in addition to those of the seventh embodiment. When a copying operation is being performed, the scanner 100 does not receive a print request from personal computers, thereby preventing the performance in the copying process from becoming inefficient.

The embodiments have been described in terms of an interface USB 2.0 via which the scanner 100 and printer 200 are linked. The present invention may also employ an exclusive interface or a general-purpose interface such as IEEE1394, SCSI, or IEEE1284 that allows bi-directional communications.

The seventh embodiment has been described with respect to a file name as print data identification information. The identification information may also include "time required for transferring data from a personal computer" and "the name of a computer".

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing apparatus comprising:
    a first memory that stores data received from a host apparatus;
    a second memory that stores data read from an original;
    an outputting section that receives the data from said first memory and said second memory and outputs the data to a printing apparatus;
    a detecting section that obtains a status of the printing apparatus and determines whether the printing apparatus is unable to print due to a printing malfunction of the printing apparatus;
    a cancel commanding section that commands the printing apparatus to clear the data, which has been received from said outputting section but has not been printed due to the printing malfunction, if said detecting section determines that the printing apparatus is unable to print due to the printing malfunction; and
    a data identifying section that identifies whether the data outputted from said outputting section is data from said second memory,
    wherein if said data identifying section identifies that the data outputted from said outputting section is data from said second memory and said detecting section determines that the printing apparatus is unable to print due to the printing malfunction, said cancel commanding section commands the printing apparatus to clear the data which has been received from said outputting section but has not been printed.

2. The image processing apparatus according to claim 1, further comprising:
    a display section that displays a screen that prompts the operator to select either continuing outputting of data to the printing apparatus or interrupting outputting of data to the printing apparatus if said data identifying section identifies that the data outputted from said outputting section is the data from said second memory and said detecting section determines that the printing apparatus is unable to print due to the printing malfunction; and
    an operating section through which the operator selects either continuation of outputting of data to the printing apparatus or interruption of outputting of data to the printing apparatus.

3. The image processing apparatus according to claim 1, further comprising an interface section that notifies the host apparatus that the printing apparatus has terminated a printing operation due to the printing malfunction, said interface section notifying the host apparatus if said data identifying section identifies that the data outputted from said outputting section is not from said second memory and said detecting section determines that the printing apparatus is unable to print due to the printing malfunction.

4. The image processing apparatus according to claim 1, further comprising a display section, wherein if said detecting section determines that the printing apparatus is unable to print due to the printing malfunction, said display section displays a display indicative that the printing apparatus is unable to print due to the printing malfunction, and
    wherein after said detecting section determines that the printing apparatus is unable to print due to the printing malfunction, said detecting section continues to obtain a status of the printing apparatus to determine whether the printing apparatus has become able to print, and
    wherein if said detecting section determines that the printing apparatus has become able to print, said display section clears a display indicating that the printing apparatus is unable to print due to the printing malfunction.

5. The image processing apparatus according to claim 1, wherein when said outputting section is outputting the data from said second memory to the printing apparatus, the data is not received from the host apparatus.

6. The image processing apparatus according to claim 1, further comprising:
a transmitter identifying section that obtains identification information on the data stored in said first memory;
a memory that stores the identification information;
a display section that displays the identification information and a display screen that prompts an operator to select either continuing outputting of data to the printing apparatus or interrupting outputting of data to the printing apparatus, the identification information and a display screen being displayed when said data identifying section identifies that the data outputted from said outputting section is data from said second memory and said detecting section determines that the printing apparatus is unable to print due to the printing malfunction, and
an operating section through which the operator selects either continuing outputting of data to the printing apparatus or interrupting outputting of data to the printing apparatus.

7. The image processing apparatus according to claim 6, further comprising an operating section through which the operator either inputs a desired value of the reference time length or selects a desired value from a plurality of values of the reference time length; and
a recording section that holds the desired value.

8. The image processing apparatus according to claim 1, wherein the image processing apparatus is a scanner unit.

9. An image processing apparatus comprising:
a first memory that stores data received from a host apparatus;
a second memory that stores data read from an original;
an outputting section that receives the data from said first memory and said second memory and outputs the data to a printing apparatus;
a detecting section that obtains a status of the printing apparatus and determines whether the printing apparatus is unable to print;
a cancel commanding section that commands the printing apparatus to clear the data received from said outputting section when said detecting section determines that the printing apparatus is unable to print;
a data identifying section that identifies whether the data outputted from said outputting section is data from said second memory; and
a monitor that monitors a time length elapsed after said outputting section interrupts transfer of data to the printing apparatus;
wherein when said data identifying section identifies that the data outputted from said outputting section is data from said second memory and said detecting section determines whether the printing apparatus is unable to print, said cancel commanding section commands the printing apparatus to clear the data received from said outputting section, and
wherein when the time length elapsed exceeds a reference time length, said monitor determines that the printing apparatus is unable to print.

10. An image processing apparatus comprising:
a first memory that stores data received from a host apparatus;
a second memory that stores data read from an original;
an outputting section that receives the data from said first memory and said second memory and outputs the data to a printing apparatus;
a detecting section that obtains a status of the printing apparatus and determines whether the printing apparatus is unable to print due to a printing malfunction of the printing apparatus; and
a cancel commanding section that commands the printing apparatus to clear the data, which has been received from said outputting section but has not been printed due to the printing malfunction, if said detecting section determines that the printing apparatus is unable to print due to the printing malfunction; and
a monitor that monitors a time length elapsed after said outputting section interrupts transfer of data to the printing apparatus.
wherein when the time length elapsed exceeds a reference time length, said monitor determines that the printing apparatus is unable to print due to the printing malfunction.

11. An image processing apparatus comprising:
An image processing apparatus comprising:
a first memory that stores data received from a host apparatus;
a second memory that stores data read from an original;
an outputting section that receives the data from said first memory and said second memory and outputs the data to a printing apparatus;
a detecting section that obtains a status of the printing apparatus and determines whether the printing apparatus is unable to print due to a printing malfunction of the printing apparatus; and
a cancel commanding section that commands the printing apparatus to clear the data, which has been received from said outputting section but has not been printed due to the printing malfunction, if said detecting section determines that the printing apparatus is unable to print due to the printing malfunction; and
a display section, wherein when said detecting section determines that the printing apparatus is unable to print due to the printing malfunction, said display section displays a display indicative that the printing apparatus is unable to print due to the printing malfunction,
wherein after said detecting section determines that the printing apparatus is unable to print due to the printing malfunction, said detecting section continues to obtain a status of the printing apparatus to determine whether the printing apparatus has become able to print, and
wherein if said detecting section determines that the printing apparatus has become able to print, said display section clears a display indicating that the printing apparatus is unable to print due to the printing malfunction.

12. An image processing apparatus comprising:
An image processing apparatus comprising;
a first memory that stores data received from a host apparatus;
a second memory that stores data read from an original;
an outputting section that receives the data from said first memory and said second memory and outputs the data to a printing apparatus;
a detecting section that obtains a status of the printing apparatus and determines whether the printing apparatus is unable to print due to a printing malfunction of the printing apparatus; and
a cancel commanding section that commands the Printing apparatus to clear the data, which has been received from said outputting section but has not been printed due to the printing malfunction, if said detecting section determines that the printing apparatus is unable to print due to the printing malfunction;

a display section that displays a screen that prompts an operator to select either continuing outputting of data to the printing apparatus or interrupting outputting of data to the printing apparatus if said detecting section determines that the printing apparatus is unable to print due to the printing malfunction; and an operating section through which the operator selects either continuing outputting of data to the printing apparatus or interrupting outputting of data to the printing apparatus.

13. An image processing apparatus comprising:

a first memory that stores data received from a host apparatus;

a second memory that stores data read from an original;

an outputting section that receives the data from said first memory and said second memory and outputs the data to a printing apparatus;

a detecting section that obtains a status of the printing apparatus and determines whether the printing apparatus is unable to print due to a printing malfunction of the printing apparatus;

a cancel commanding section that commands the printing apparatus to clear the data, which has been received from said outputting section but has not been printed due to the printing malfunction, if said detecting section determines that the printing apparatus is unable to print due to the printing malfunction; and a data identifying section that identifies whether the data outputted from said outputting section is data from said first memory.

wherein if said data identifying section identifies that the data outputted from said outputting section is data from said first memory and said detecting section determines that the printing apparatus is unable to print due to the printing malfunction, said cancel commanding section prevents the printing apparatus from clearing the data which has been received from said outputting section but has not been printed.

14. An image forming system comprising:

a host apparatus that outputs print data;

a data identifying section that identifies whether the data outputted from said outputting section is data from said first memory;

a printing apparatus that prints the print data on a medium; and an image processing apparatus via which the host apparatus and the printing apparatus are linked;

wherein the image processing apparatus includes:

a first memory that stores data received from a host apparatus;

a second memory that stores data received from an original;

an outputting section that receives the data from said first memory and said second memory and outputs the data to the printing apparatus;

a data identifying section that identifies whether the data outputted from said outputting section is data from said second memory;

a detecting section that obtains a status of the printing apparatus and determines whether the printing apparatus is unable to print due to a printing malfunction of the printing apparatus; and a cancel commanding section that outputs a command to the printing apparatus to clear the data which has been received from said outputting section but has not been printed due to the printing malfunction, if the printing apparatus is unable to print due to the printing malfunction, wherein when the printing apparatus receives a command for clearing the data in the printing apparatus from said cancel commanding section. the data being received from said outputting section but having not been printed, the printing apparatus clears the data which has been received from said outputting section but has not been printed, and wherein if said data identifying section identifies that the data outputted from said outputting section is data from said first memory and said detecting section determines that the printing apparatus is unable to print due to the printing malfunction, said cancel commanding section prevents the printing apparatus from clearing the data which has been received from said outputting section but has not been printed.

15. An image processing system comprising:

a host apparatus that outputs print data:

a data identifying section that identifies whether the data outputted from said outputting section is data from said second memory;

a printing apparatus that prints the print data on a medium; and an image processing apparatus via which the host apparatus and the printing apparatus are linked;

wherein the image processing apparatus includes:

a first memory that stores data received from a host apparatus;

a second memory that stores data received from an original;

an outputting section that receives the data from said first memory and said second memory and outputs the data to the printing apparatus;

a data identifying section that identifies whether the data outputted from said outputting section is data from said second memory;

a detecting section that obtains a status of the printing apparatus and determines whether the printing apparatus is unable to print due to a printing malfunction of the printing apparatus; and a cancel commanding section that outputs a command to the printing apparatus to clear the data which has been received from said outputting section but has not been printed due to the printing malfunction, if the printing apparatus is unable to print due to the printing malfunction, wherein when the printing apparatus receives a command for clearing the data in the printing apparatus from said cancel commanding section. the data being received from said outputting section but having not been printed, the printing apparatus clears the data which has been received from said outputting section but has not been printed, and wherein if said data identifying section identifies that the data outputted from said outputting section is data from said second memory and said detecting section determines that the printing apparatus is unable to print due to the printing malfunction, said cancel commanding section commands the printing apparatus to clear the data which has been received from said outputting section but has not been printed.

* * * * *